US012380713B2

(12) United States Patent
Estrada Diaz

(10) Patent No.: US 12,380,713 B2
(45) Date of Patent: Aug. 5, 2025

(54) SYSTEM AND METHOD FOR SMART RECIPE GENERATION

(71) Applicant: Google LLC, Mountain View, CA (US)

(72) Inventor: Omar Estrada Diaz, Sacramento, CA (US)

(73) Assignee: Google LLC, Mountain View, CA (US)

(*) Notice: Subject to any disclaimer, the term of this patent is extended or adjusted under 35 U.S.C. 154(b) by 392 days.

(21) Appl. No.: 17/932,152

(22) Filed: Sep. 14, 2022

(65) Prior Publication Data

US 2024/0087345 A1 Mar. 14, 2024

(51) Int. Cl.
| | |
|---|---|
| *G06V 20/68* | (2022.01) |
| *G06V 10/82* | (2022.01) |
| *G06V 20/20* | (2022.01) |
| *G06V 20/50* | (2022.01) |
| *G06V 20/70* | (2022.01) |
| *G06V 40/20* | (2022.01) |

(Continued)

(52) U.S. Cl.
CPC .............. *G06V 20/68* (2022.01); *G06V 10/82* (2022.01); *G06V 20/50* (2022.01); *G06V 20/70* (2022.01); *G06V 40/20* (2022.01); *G06F 3/011* (2013.01); *G06F 3/14* (2013.01)

(58) Field of Classification Search
CPC ........ G06V 20/68; G06V 10/82; G06V 20/50; G06V 20/70; G06V 40/20; G06V 20/20; G06F 3/011; G06F 3/14
See application file for complete search history.

(56) References Cited

U.S. PATENT DOCUMENTS 11,238,664 B1 * 2/2022 Tavakoli ............ G06Q 30/0631
2009/0258331 A1 10/2009 Do et al.
(Continued)

FOREIGN PATENT DOCUMENTS

DE 102016109894 A1 * 11/2017
JP 2021140711 A * 9/2021

OTHER PUBLICATIONS

Malmaud, Jonathan, et al. "What's cookin'? interpreting cooking videos using text, speech and vision." arXiv preprint arXiv: 1503.01558 (2015). (Year: 2015).*
(Continued)

*Primary Examiner* — Henok Shiferaw
*Assistant Examiner* — Dion J Satcher
(74) *Attorney, Agent, or Firm* — Brake Hughes Bellermann LLP

(57) ABSTRACT

Methods and devices are provided where a wearable device may receive sensor data and activate a recipe building mode of the wearable device when the sensor data satisfies a commencement condition. An image sensor of the wearable device may capture images of a physical environment. A recognition engine of the wearable device may identify ingredients detected in the images, determine an amount of the ingredients, identify utensils detected in the images, track actions of a user based on the images, and determine the name of a recipe, in response to terminating the capture of the images. The wearable device may store the recipe, the recipe including the name of the recipe, the ingredients, the amount of ingredients, the utensils, the actions of the user, and the one or more images. The recipe may be annotated with captions and output on a display of the wearable device.

20 Claims, 16 Drawing Sheets

(51) Int. Cl.
*G06F 3/01* (2006.01)
*G06F 3/14* (2006.01)

(56) References Cited

U.S. PATENT DOCUMENTS

| | | | | |
|---|---|---|---|---|
| 2014/0147829 | A1 | 5/2014 | Jerauld | |
| 2017/0103676 | A1* | 4/2017 | Allen | G09B 19/0092 |
| 2018/0000274 | A1* | 1/2018 | Sun | A47J 36/321 |
| 2018/0257219 | A1 | 9/2018 | Oleynik | |
| 2020/0211062 | A1* | 7/2020 | Kossakovski | G06Q 30/0271 |
| 2021/0118447 | A1* | 4/2021 | Kim | G10L 15/22 |
| 2022/0273139 | A1* | 9/2022 | Mahapatra | G05B 13/0265 |
| 2022/0351509 | A1* | 11/2022 | Kanemura | G06V 20/68 |
| 2023/0252806 | A1* | 8/2023 | DeSantola | G01S 17/88 |
| | | | | 382/154 |

OTHER PUBLICATIONS

Bianco, Simone, et al. "Cooking Action Recognition with i VAT: An Interactive Video Annotation Tool." Image Analysis and Processing—ICIAP 2013: 17th International Conference, Naples, Italy, Sep. 9-13, 2013, Proceedings, Part II 17. Springer Berlin Heidelberg, 2013. (Year: 2013).*

Salvador, Amaia, et al. "Learning cross-modal embeddings for cooking recipes and food images." Proceedings of the IEEE conference on computer vision and pattern recognition. 2017. (Year: 2017).*

Chen, Jing-Jing, et al. "Deep understanding of cooking procedure for cross-modal recipe retrieval." Proceedings of the 26th ACM international conference on Multimedia. 2018. (Year: 2018).*

Malmaud, Jonathan, et al. "What's cookin'? interpreting cooking videos using text, speech and vision." arXiv preprint arXiv:1503.01558 (2015). (Year: 2015) (Year: 2015).*

Bianco, Simone, et al. "Cooking Action Recognition with i VAT: An Interactive Video Annotation Tool." Image Analysis and Processing—ICIAP 2013: 17th International Conference, Naples, Italy, Sep. 9-13, 2013, Proceedings, Part II 17. Springer Berlin Heidelberg, 2013. (Year: 2013) (Year: 2013).*

Salvador, Amaia, et al. "Learning cross-modal embeddings for cooking recipes and food images." Proceedings of the IEEE conference on computer vision and pattern recognition. 2017. (Year: 2017) (Year: 2017).*

Chen, Jing-Jing, et al. "Deep understanding of cooking procedure for cross-modal recipe retrieval." Proceedings of the 26th ACM international conference on Multimedia. 2018. (Year: 2018) (Year: 2018).*

"4.1 / Recipe Builder", retrieved from: https://help.healthiapp.com/support/solutions/articles/13000060423-4-1-recipe-builder, Nov. 17, 2021, 10 pages.

"AR Recipe App Development", Switchstance, retrieved on Sep. 14, 2022 from https://switchstance.agency/portfolio/ar-augmented-reality-recipe-app-development/, 2022, 5 pages.

"Create Custom Recipes", retrieved from: https://help.carbmanager.com/docs/create-custom-recipes, Oct. 27, 2021, 3 pages.

"Future Friday: Food Information Displayed on AR Smart Glasses", Vuzix Corporation, retrieved from https://www.vuzix.com/blogs/vuzix-blog/future-friday-food-information-displayed-on-ar-smart-glasses, 2019, 3 pages.

"Future Friday: How Smart Glasses Could Change Kitchen Life", Vuzix Corporation, retrieved from https://www.vuzix.com/blogs/vuzix-blog/future-friday-how-smart-glasses-could change-kitchen-life, 2020, 3 pages.

"How To Track A Homemade Recipe", Cali Bett, retrieved on Sep. 14, 2022 from: https://www.calibett.com/blog/how-to-track-at-home, 24 pages.

"Speech-to-Text", Google Cloud, retrieved on Sep. 14, 2022 from: https://cloud.google.com/speech-to-text, 14 pages.

Albright, "How Google Glass Will Change the Way You Cook", National Geographic Society, retrieved from: https://www.nationalgeographic.com/culture/article/how-google-glass-will-change-the-way-you-cook, Aug. 4, 2014, 8 pages.

Cheung, "YOLO for Real-Time Food Detection", retrieved from: http://bennycheung.github.io/yolo-for-real-time-food-detection, Jun. 7, 2018, 22 pages.

Diete, et al., "Recognizing Grabbing Actions from Inertial and Video Sensor Data in a Warehouse Scenario", ScienceDirect, Procedia Computer Science 110, 2017, pp. 16-23.

Farr, "Microsoft Has An Idea For Using Smart Glasses To Track Your Diet", retrieved from: https://www.cnbc.com/2017/05/09/microsoft-patents-smart-glasses-for-diet-tracking-.html, May 9, 2017, 5 pages.

Gogate, et al., "Hunger and stress monitoring system using galvanic skin response", Indonesian Journal of Electrical Engineering and Computer Science, vol. 13, No. 3, Mar. 2019, pp. 861-865.

Olynick, "AR Cooking (In Progress)", Augmented Reality, retrieved from https://www.dianaolynick.com/blog/ar-cooking-in-progress, Feb. 7, 2022, 3 pages.

Scholl, "Extract And Tag Ingredients From A Website", retrieved from: https://schollz.com/blog/ingredients/, Jul. 16, 2018, 8 pages.

* cited by examiner

US 12,380,713 B2

SYSTEM AND METHOD FOR SMART RECIPE GENERATION

BACKGROUND

Consistently preparing good food can be challenging—sometimes it may come out a bit overcooked, sometimes it may miss a pinch of that one special ingredient, and sometimes the dish comes out just right. Using conventional devices, it may be cumbersome to record every instance and step of food preparation, and to save the recipe for the one instance when the dish came out perfect.

SUMMARY

Users of mobile computing devices, such as, wearable computing devices such as smart glasses and handheld computing devices such as smartphones may use the mobile computing devices to automatically prepare and save recipes when the dish that is being prepared comes out just right. Mobile computing devices may include various sensors, output capabilities, communication capabilities, access to external resources that may collect data, interpret the collected data to perform image recognition, perform motion detection and recognition, perform voice recognition, perform speech to text translation, and process the collected data to prepare a recipe, automatically and unobtrusively, while a user is cooking.

In another example, the user may use one or more of these types of computing devices to, for example, record a cooking session with the smart glasses, which may communicate with the smart watch or the smart phone to access additional sensors installed on these devices. In another example, one or more of these types of computing devices may communicate with another computing device to perform additional computing related to image recognition, motion detection and recognition, voice recognition, and speech to text translation. These devices may seamlessly capture the information related to cooking a dish, interpret the information, and create a recipe. These recipes can later be shared and used to consistently cook flavorful food.

In one general aspect, a computer-implemented method includes receiving sensor data at a processor of a wearable device, activating a recipe building mode of the wearable device, in response to the sensor data satisfying a commencement condition, capturing, by an image sensor of the wearable device, one or more images of a physical environment around the wearable device, identifying, based on at least one recognition engine of the wearable device, ingredients detected in the one or more images, determining an amount of each of the ingredients, identifying, based on the at least one recognition engine, utensils detected in the one or more images, tracking, based on the at least one recognition engine, actions of a user based on the one or more images, determining a name for a recipe, by the at least one recognition engine, in response to terminating the capture of the one or more images, and storing the recipe in a memory, the recipe including any one or any combination of a name of the recipe, the ingredients, the amount of each of the ingredients, the utensils, the actions of the user, a time when each action of the actions is performed, and the one or more images.

In another general aspect, a wearable device, includes at least one processor, and a memory storing instructions that, when executed by the at least one processor, configures the at least one processor to: receive sensor data, activate a recipe building mode of the wearable device, in response to the sensor data satisfying a commencement condition, capture, by an image sensor of the wearable device, one or more images of a physical environment around the wearable device, identify, based on at least one recognition engine of the wearable device, ingredients detected in the one or more images, determine an amount of each of the ingredients, identify, based on the at least one recognition engine, utensils detected in the one or more images, track, based on the at least one recognition engine, actions of a user based on the images, determine the name of a recipe, in response to terminating the capture of the one or more images, and store the recipe in the memory, the recipe including any one or any combination of a name of the recipe, the ingredients, the amount of each of the ingredients, the utensils, the actions of the user, and the one or more images.

The details of one or more implementations are set forth in the accompanying drawings and the description below. Other features will be apparent from the description and drawings, and from the claims.

DETAILED DESCRIPTION

Figure 1A:
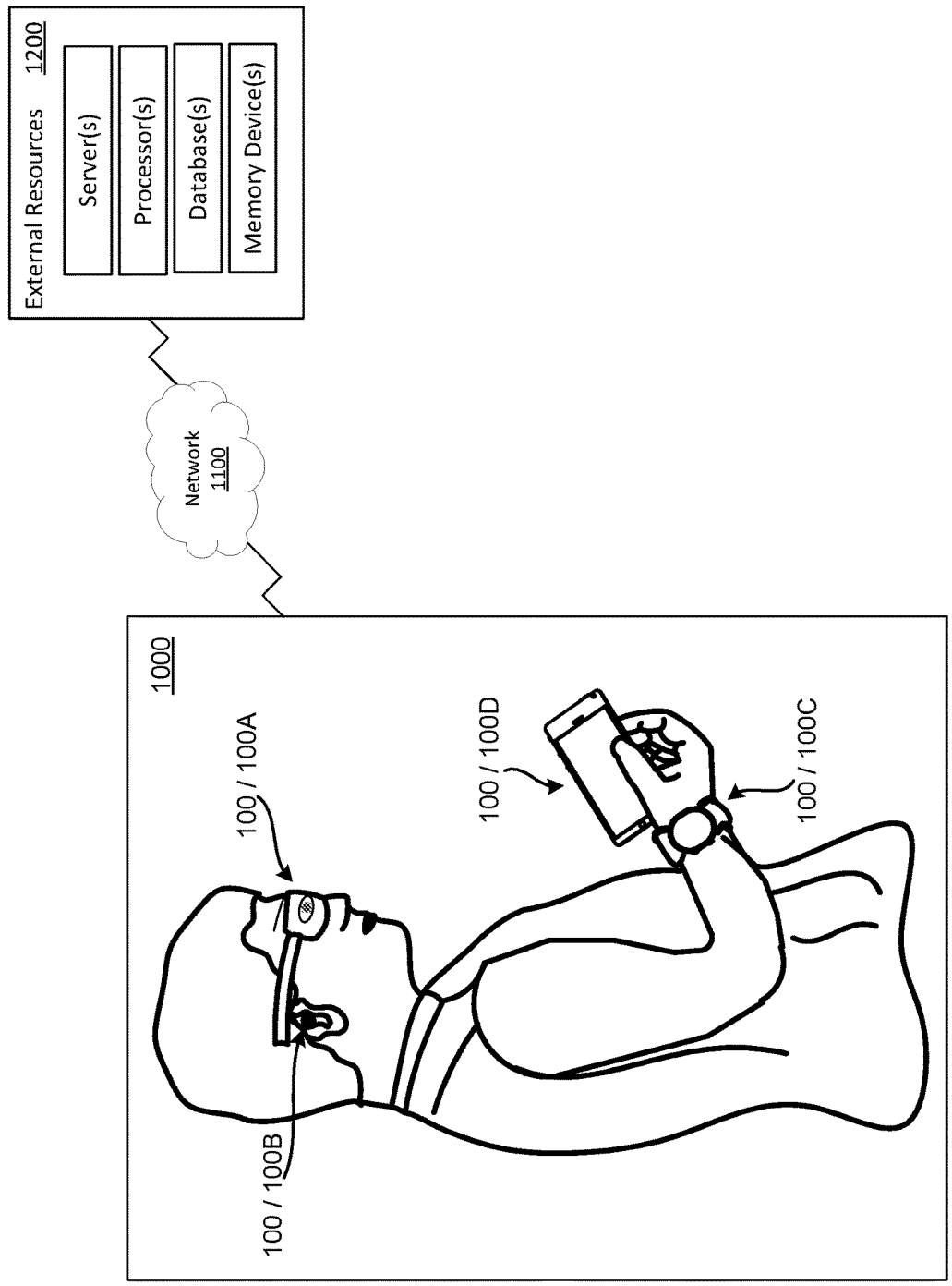
FIG. 1A illustrates an example system, in accordance with implementations described herein.

Mobile computing devices may include various sensors, output capabilities, communication capabilities, access to external resources and the like that may collect data and may process the collected data to prepare a recipe, automatically and unobtrusively, while a user is cooking. Several different types of computing devices may be used to capture and access information related to objects and/or motion events in the physical environment. Such computing devices may include, for example, handheld computing devices (smartphones and the like), head mounted computing devices (smart glasses, goggles, headsets and the like), wearable computing devices such as hand and/or wrist worn computing devices (smart watches, smart bracelets, smart rings, and the like), ear worn computing devices, neck worn lanyard computing devices, other mobile computing devices (tablet computing devices, laptop computing devices and the like). In some examples, the user may use one or more of these types of computing devices to, for example, record a cooking session with a smart glasses, which may communicate with the smart watch or the smart phone to access additional sensors installed on these devices. In another example, one or more of these types of computing devices may communicate with another computing device to perform additional computing related to image recognition, motion detection and recognition, voice recognition, and speech to text translation. These devices may seamlessly capture the information related to cooking a dish, interpret the information, and create a recipe.

Recording each cooking event, identifying the utensils used for cooking, cataloging the different actions recorded during cooking, identifying and tabulating each of the ingredients used during cooking, and putting all of these information together during cooking may be cumbersome and time consuming for the user, particularly if the user has to do so each time that they cook, hoping not to miss the recipe for the one time that the cooked dish came out right. A system and method that seamlessly and unobtrusively prepares a recipe each time that cooking is started may help create recipes that users cherish and use to consistently prepare great food.

In an example, the computing devices of the system and method may capture and record images of the cooking environment, identify the ingredients and the utensils from the cooking environment, determine an amount of each of the ingredients, track the actions of the user when the user is cooking, and create a recipe based on the information that has been recorded and inferred. In an example, the computing devices may recognize the ingredients, the amount of ingredients, and the utensils based on a recognition engine disposed on one or more of the computing devices. In an example, the computing devices may determine the amount of each of the ingredients used for the recipe based on a recognition engine disposed on one or more of the computing devices. In an example, the recognition engine may be based on a neural network. In an example, the neural network-based recognition engine may be trained to recognize the ingredients being used to cook. In an example, the neural network-based recognition engine may be trained to recognize the amounts of the ingredients being used to cook. In an example, the neural network-based recognition engine may be trained to recognize the utensils used in the cooking process. In an example, the neural network-based recognition engine may be trained to recognize the amount of each of the cooking ingredients. In an example, the neural network-based recognition engine may be trained to recognize the various actions involved in cooking, such as, for example, grabbing, chopping, stirring, pouring, pinching, picking, cutting, whisking, chopping, etc. In this manner, the neural network-based recognition engine provides a technical solution to the technical problem presented when a user cooks without measuring utensils in order to recognize and document the amount of each of the cooking ingredients as well as the associated actions that incorporate those ingredients into the cooking process.

Systems and methods described herein may use data collected by one or more sensors of a computing device to identify objects and/or motion events in the physical environment. The one or more sensors may include, for example, image sensors such as cameras, audio sensors such as microphones, location sensors, position and/or orientation sensors, inertial sensors, such as an accelerometer, a magnetometer, a gyroscope, and a Global Positioning System (GPS) sensor and other such sensors. Systems and methods, in accordance with implementations described herein, may access information related to the identified objects, ingredients, and/or action(s). In some examples, the information is available from data stored on the computing device. In some examples, the information is available in an external database that is accessible to the computing device.

If a user handles and operates computing devices when the user is cooking, the cooking process may be hindered, and/or the computing devices may get smudged or may be improperly operated when handled during cooking. Systems and methods described herein may automatically and unobtrusively create a recipe when the user is cooking while wearing a computing device like a head mounted computing device, such as, for example, smart glasses or goggles. The creation of the recipe is unobtrusive to the user and does not interfere with or hinder the cooking activities. If the dish comes out right, the user may store the recipe for sharing and future use. In another example, the user may choose not to save the recipe. In some examples, the systems and methods may interact with the user to get his feedback regarding the data that is being interpreted and saved during the cooking process. In other examples, the system and methods described herein may create the recipe without interaction with the user during the cooking process. In this manner, head mounted computing devices, such as, for example, smart glasses or goggles provides a technical solution to the technical problem presented of capturing a cooking event when a user cooks without obstructing the cooking process or the handling of the computing devices.

FIG. 1A illustrates an example of the user in a physical environment 1000, with multiple different example computing devices 100 that may be used by the user in the physical environment 1000. In an example, the physical environment may be the kitchen of a user's home, or a kitchen at some other location. The computing devices 100 may be a mobile computing device and may include wearable computing devices and handheld computing devices, as shown in FIG. 1A. In the example shown in FIG. 1A, the example computing devices 100 include a first computing device 100A in the form of an example head mounted display (HMD) device, or smart glasses, a second computing device 100B in the form of an example ear worn device, or ear bud(s), a third computing device 100C in the form of an example wrist worn device, or a smart watch, and a fourth computing device 100D in the form of an example handheld computing device, or smartphone. The example computing devices 100 shown in FIG. 1A may be connected and/or paired so that they can communicate with, and exchange information with, each other. In some examples, the example computing devices 100 shown in FIG. 1A may access external resources 1200 via a network 1100.

Figure 1B:
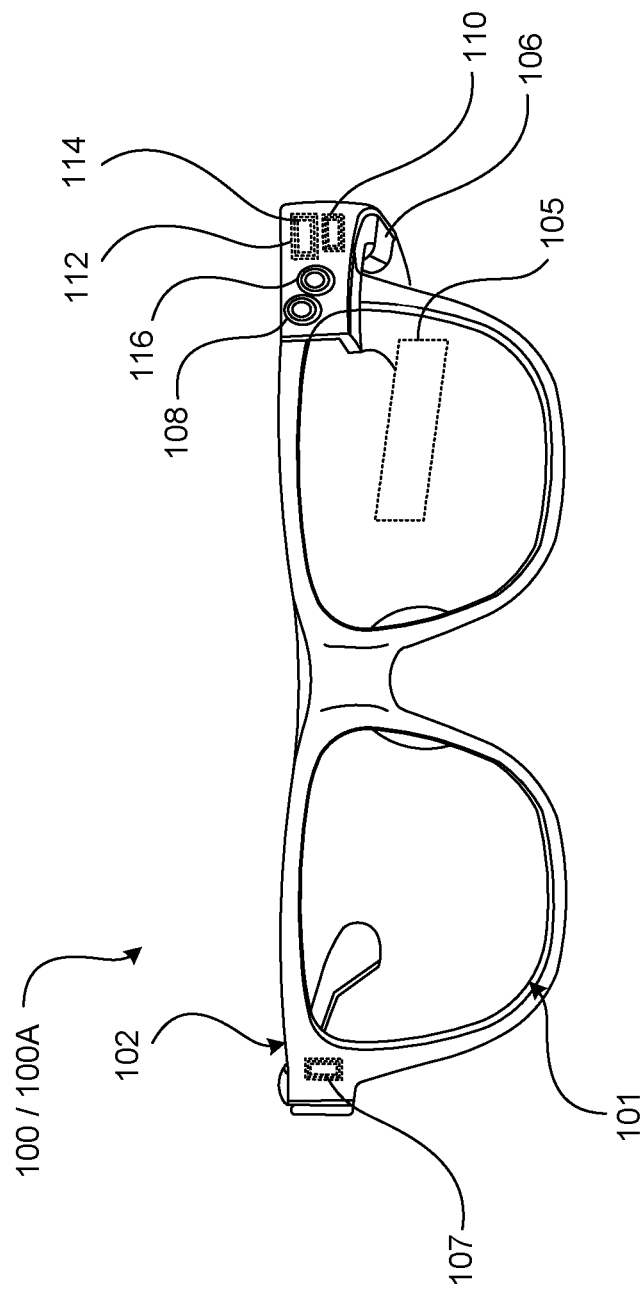
FIGS. 1B-1E illustrate example computing devices that can be used in the example system shown in FIG. 1A.
Figure 1C:
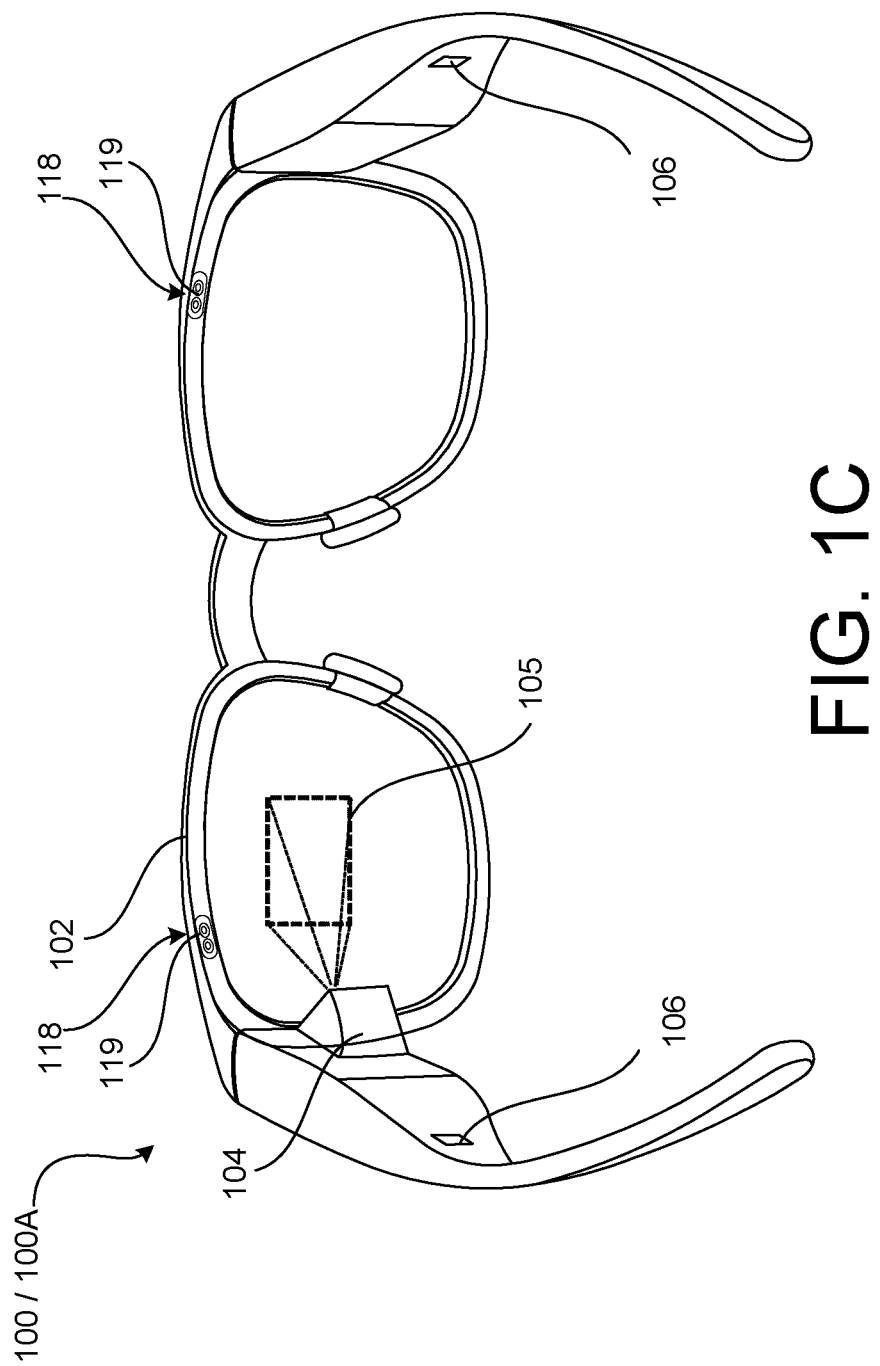
Figure 1D:
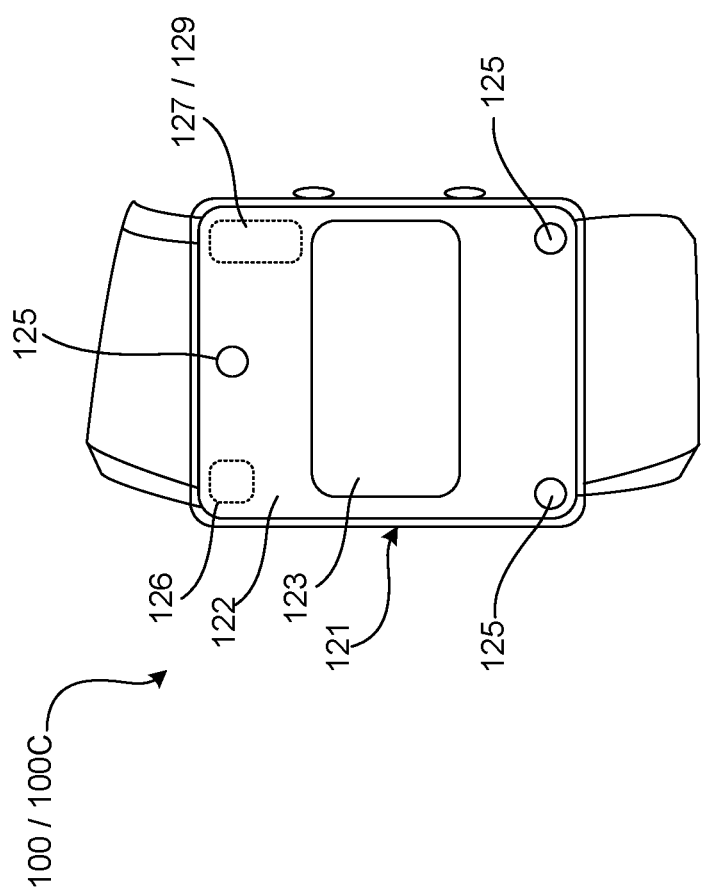
Figure 1E:
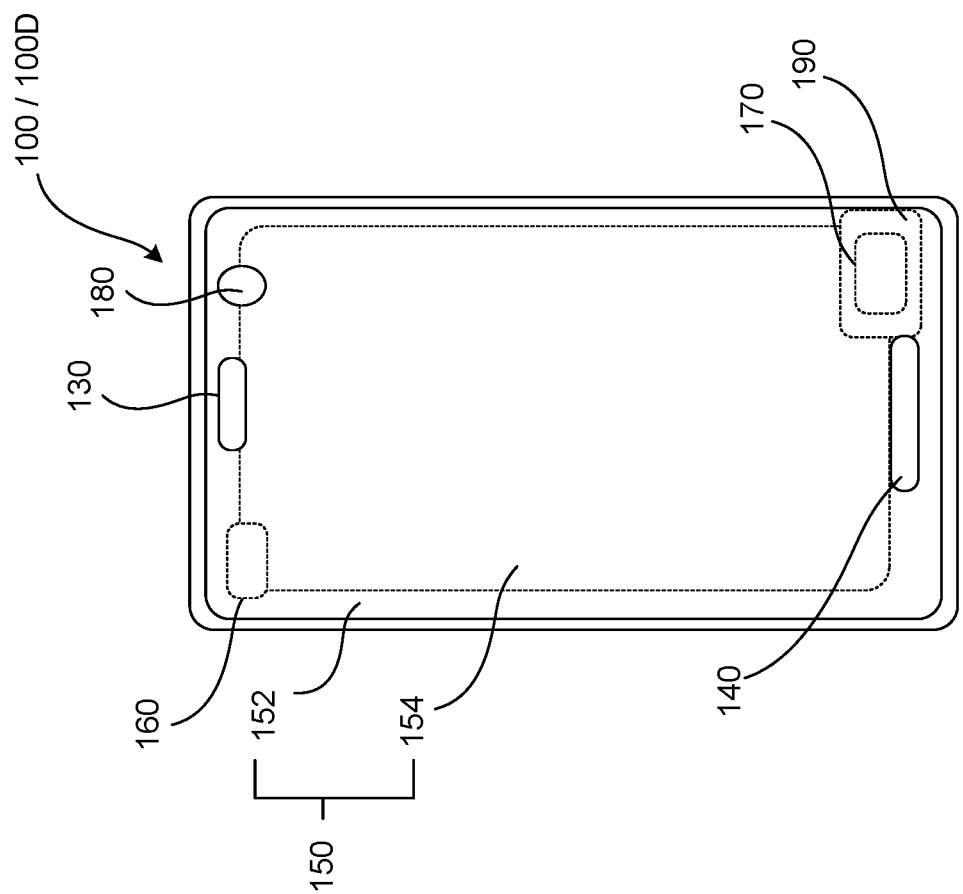

FIG. 1B illustrates an example of a front view and FIG. 1C illustrates an example of a rear view of the first computing device 100A in the form of smart glasses. FIG. 1D is a front view of the third computing device in the form of a smart watch. FIG. 1E is a front view of the fourth computing device 100D in the form of a smartphone. Hereinafter, example systems and methods will be described with respect to the use of the example computing device 100 in the form of the head mounted wearable computing device shown in FIGS. 1B and 1C, the wrist worn computing device shown in FIG. 1D, and/or the handheld computing device in the form of the smartphone shown in FIG. 1E, simply for purposes of discussion and illustration. The principles to be described herein may be applied to other types of mobile computing devices, including the computing devices 100 shown in FIG. 1A, and other mobile computing devices not specifically shown.

As shown in FIGS. 1B and 1C, in some examples, the first computing device 100A is a head mounted display (HMD) device such as an optical head-mounted display (OHMD) device, a transparent heads-up display (HUD) device, an augmented reality (AR) device, or other devices such as googles or headsets having sensors, display, and computing capabilities. In some examples, the first computing device 100A are smart glasses. In some examples, the smart glasses may superimpose information (e.g., digital images) onto a field of view through smart optics. Smart glasses are effectively wearable computers which can run self-contained mobile apps (e.g., one or more applications 260 of FIG. 2). In some examples, smart glasses are hands-free and may communicate with the Internet via natural language voice commands, while others may touch buttons.

In some examples, the first computing device 100A includes a frame 102 having rim portions surrounding lens portions. The first computing device 100A includes temple portions that are pivotally attached to two opposing ends of the rim portions. In some examples, a display device 104 is coupled in one or both of the temple portions of the frame 102, to display content to the user within an eye box display 105 formed on the display 101. In some examples, the first computing device 100A can also include an audio output device 106 (for example, one or more speakers), an audio input device 107 (for example, a microphone), an illumination device 108, a sensing system 110, a control system 112, at least one processor 114, and an outward facing imaging sensor 116 (for example, a camera). In some examples, the first computing device 100A adds information (e.g., projects an eye box display 105) alongside what the wearer views through the glasses, i.e., superimposing information (e.g., digital images) onto a field of view of the user. In some examples, the display device 104 may include a see-through near-eye display. For example, the display device 104 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow the user to see both physical items in the world next to digital images (e.g., user interface elements, virtual content, etc.) generated by the display device 104. In some examples, waveguide optics may be used to depict content for output by the display device 104.

The sensing system 110 may include various sensing devices and the control system 112 may include various control system devices to facilitate operation of the computing devices 100 including, for example, at least one processor 114 operably coupled to the components of the control system 112. In some examples, the control system 112 may include a communication module providing for communication and exchange of information between the computing devices 100 and other external devices.

In some examples, the imaging sensor 116 may be an outward facing camera, or a world facing camera that can capture still and/or moving images of external objects in the physical environment within a field of view of the imaging sensor 116. In some examples, the imaging sensor 116 may be a depth camera that can collect data related to distances of the external objects from the imaging sensor 116. In some examples, the illumination device 108 may selectively operate, for example, with the imaging sensor 116, for detection of objects in the field of view of the imaging sensor 116.

In some examples, the computing device 100A includes a gaze tracking device 118 including, for example, one or more image sensors 119. The gaze tracking device 118 may detect and track eye gaze direction and movement. Images captured by the one or more image sensors 119 may be processed to detect and track gaze direction and movement, and to detect gaze fixation. In some examples, identification or recognition operations of the first computing device 100A may be triggered when the gaze directed at the objects/entities has a duration that is greater than or equal to a threshold duration/preset amount of time. In some examples, the detected gaze may define the field of view for detecting ingredients, utensils, and actions/motions of the user for preparation of the recipe. In some examples, the detected gaze may be processed as a user input for interaction with external objects in the physical environment 1000 that are visible to the user through the lens portions of the first computing device 100A. In some examples, the first computing device 100A may be hands-free and can communicate with the Internet via natural language voice commands, while others use touch buttons.

FIG. 1D is a front view of the third computing device 100C in the form of an example wrist worn device or a smart watch, which is worn on a wrist of a user. The third computing device 100C includes an interface device 121. In some examples, the interface device 121 may function as an input device, including, for example, a touch surface 122 that can receive touch inputs from the user. In some examples, the interface device 121 may function as an output device, including, for example, a display portion 123 enabling the interface device 121 to output information to the user. In some examples, the interface device 121 can function as an input device and an output device. The third computing device 100C may include a sensing system 126 including various sensing system devices. In some examples, the sensing system 126 may include for example, an accelerometer, a gyroscope, a magnetometer, a Global Positioning System (GPS) sensor, and the like included in an inertial measurement unit (IMU). The third computing device 100C may include a control system 127 including various control system devices and a processor 129 to facilitate operation of the third computing device 100C.

In some implementations, the third computing device 100C may include a plurality of markers 125. The plurality of markers 125 may be detectable by the first computing device 100A, for example, by the outward facing imaging sensor 116 or the one or more image sensors 119 of the first computing device 100A, to provide data for the detection and tracking of the position and/or orientation of the third computing device 100C relative to the first computing device 100A.

FIG. 1E is a front view of the fourth computing device 100D in the form of a smart phone held by the user in FIG. 1A. The fourth computing device 100D may include an interface device 150. In some implementations, the interface device 150 may function as an output device, including, for example, a display portion 152, allowing the interface device 150 to output information to the user. In some implementations, the interface device 150 may function as an input device, including, for example, a touch input portion 154 that can receive, for example, touch inputs from the user. In some implementations, the interface device 150 can function as an input device and an output device. In some implementations, the fourth computing device 100D includes an audio output device 130 (for example, a speaker). In some implementations, the fourth computing device 100D includes an audio input device 140 (for example, a microphone) that detects audio signals for processing by the fourth computing device 100D. In some implementations, the fourth computing device 100D includes an image sensor 180 (for example, a camera), that can capture still and/or moving images in the field of view of the image sensor 180. The fourth computing device 100D may include a sensing system 160 including various sensing system devices. In some examples, the sensing system 160 may include for example, an accelerometer, a gyroscope, a magnetometer, a Global Positioning System (GPS) sensor and the like included in an inertial measurement unit (IMU). The fourth computing device 100D may include a control system 170 including various control system devices and a processor 190, to facilitate operation of the fourth computing device 100D.

Figure 2:
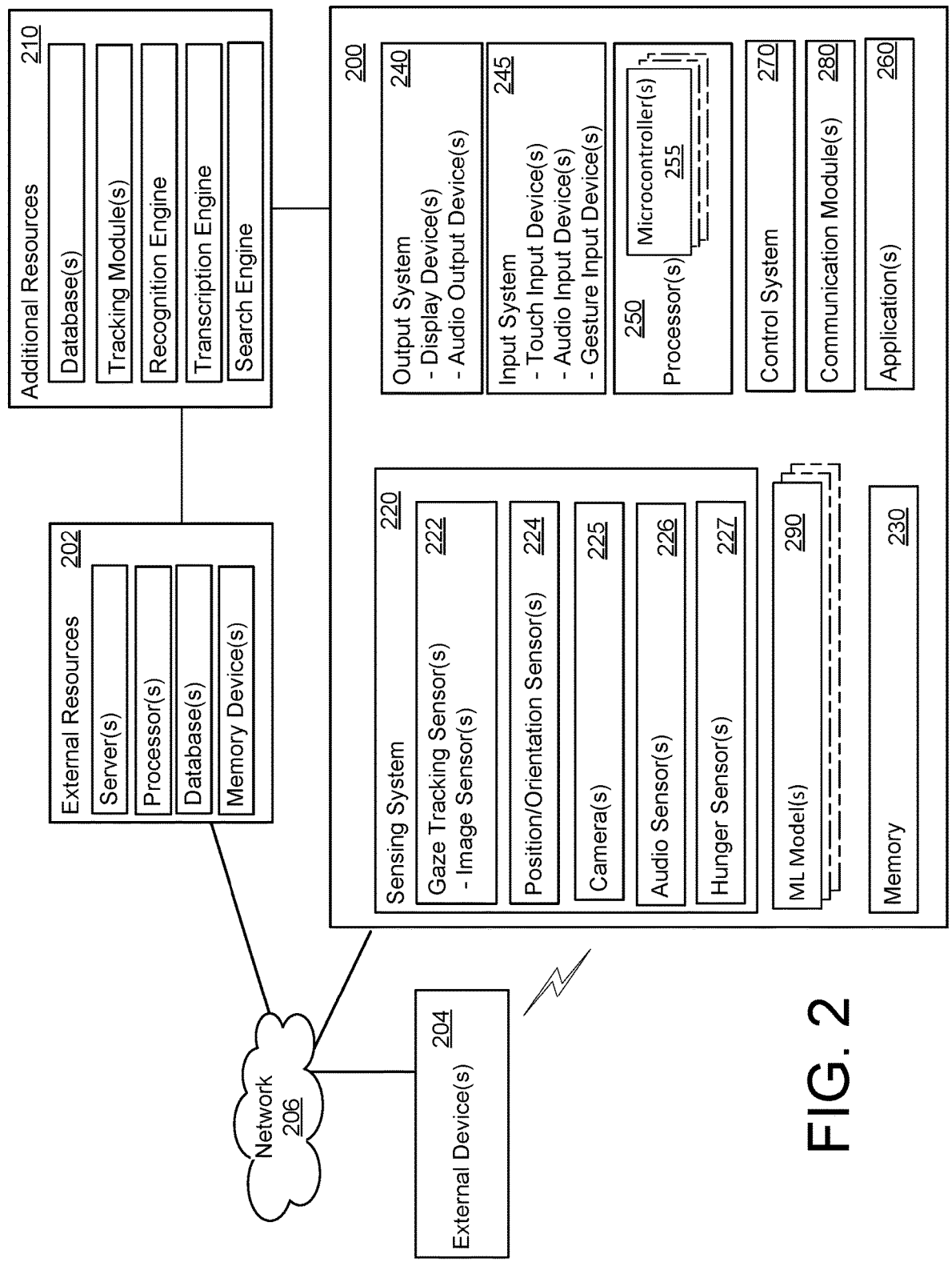
FIG. 2 is a diagram illustrating an example system configured to implement the concepts described herein.

FIG. 2 is a diagram illustrating an example of an example system including an example computing device 200. In the example system shown in FIG. 2, the example computing device 200 may be, for example, one of the example computing devices 100 (100A, 100B, 100C, 100D) shown in FIG. 1A and described in more detail with respect to FIGS. 1B-1E. The example computing device 200 may be another type of computing device not specifically described above, that can detect user input, which can output content to the user, and other such functionality to be operable in the disclosed systems and methods.

In the example arrangement shown in FIG. 2, the computing device 200 can communicate selectively via a network 206 to access external resources 202. The external resources may include, for example, server computer systems, processors, databases, memory storage, and the like. The computing device 200 can operate under the control of a control system 270. The computing device 200 can communicate with one or more external computing devices 204 (another wearable computing device, another mobile computing device, an external controllable device, and the like) either directly (via wired and/or wireless communication), or via the network 206. The computing device 200 can include a communication module 280 to facilitate external communication. In some implementations, the computing device 200 includes a sensing system 220 including various sensing system components including, for example one or more gaze tracking sensors 222 including, for example image sensors, one or more position/orientation sensor(s) 224 including for example, accelerometer, gyroscope, magnetometer, Global Positioning System (GPS) and the like included in an IMU, one or more audio sensors 226 that can detect audio input, and one or more hunger sensors 227 that can detect hunger in the user. In an example, the one or more hunger sensors 227 may be based on a galvanic skin response ("GSR") or an electrodermal activity sensor.

In some implementations, the computing device 200 may include one or more camera(s) 225. The camera(s) 225 may be, for example, outward facing, or world facing cameras that can capture still and/or moving images of an environment outside of the computing device 200. The computing device 200 can include more, or fewer, sensing devices and/or combinations of sensing devices.

In some implementations, the computing device 200 may include an output system 240 including, for example, one or more display devices that can display still and/or moving image content and one or more audio output devices that can output audio content. In some implementations, the computing device 200 may include an input system 245 including, for example, one or more touch input devices that can detect user touch inputs, an audio input device that can detect user audio inputs, a gesture input device that can detect user gesture inputs (i.e., via image detection, via position detection and the like), and other such input devices. The still and/or moving images captured by the camera(s) 225 may be displayed by the display device of the output system 240 and/or transmitted externally via the communication module 280 and the 206, and/or stored in a memory 230 of the computing device 200.

The computing device 200 may include one or more processors 250, which may be formed in a substrate configured to execute one or more machine executable instructions or pieces of software, firmware, or a combination thereof. In some examples, the processor(s) 250 are included as part of a system on chip (SOC). The processor(s) 250 may be semiconductor-based that include semiconductor material that can perform digital logic. The processor(s) 250 includes a microcontroller 255. In some examples, the microcontroller 255 is a subsystem within the SOC and can include a process, memory, and input/output peripherals.

In some examples, the computing device 200 includes one or more applications 260, which can be stored in the memory 230, and that, when executed by the processor(s) 250, perform certain operations. The one or more applications 260 may widely vary depending on the use case, but may include browser applications to search web content, sound recognition applications such as speech-to-text applications, image recognition applications (including object and/or facial detection (and tracking) applications, barcode decoding applications, text OCR applications, etc.), and/or other applications that can enable the computing device 200 to perform certain functions (e.g., capture an image, record a video, get directions, send a message, etc.). In some examples, the one or more applications 260 may include an email application, a calendar application, a storage application, a voice call application, and/or a messaging application.

In some examples, the microcontroller 255 is configured to execute a machine-learning (ML) model 290 to perform an inference operation related to audio and/or image processing using sensor data. In some examples, the computing device 200 includes multiple microcontrollers 255 and multiple ML models 290 that perform multiple inference operations, which can communicate with each other and/or other devices (e.g., external device(s) 204 and/or external resources 202).

In some examples, the audio and/or image processing that is performed on the sensor data obtained by the sensor(s) of the sensing system 220 are referred to as inference operations (or ML inference operations). An inference operation may refer to an audio and/or image processing operation, step, or sub-step that involves a ML model that makes (or leads to) one or more predictions. Certain types of audio and/or image processing use ML models to make predictions. For example, machine learning may use statistical algorithms that learn data from existing data to render a decision about new data, which is a process called inference. In other words, inference refers to the process of taking a model that is already trained and using that trained model to make predictions. Some examples of inference may include sound recognition (e.g., speech-to-text recognition), image recognition (e.g., object identifications, etc.), image recognition (e.g., facial recognition and tracking, etc.), and/or perception (e.g., always-on sensing, voice-input request sensing, etc.). The ML model 290 may define several parameters that are used by the ML model 290 to make an inference or prediction. In some examples, the number of parameters is in a range between 10k and 100k. In some examples, the number of parameters is less than 10k. In some examples, the number of parameters is in a range between 10M and 100M. In some examples, the number of parameters is greater than 100M.

In some examples, a ML model includes one or more neural networks. Neural networks transform an input, received by the input layer, transform it through a series of hidden layers, and produce an output via the output layer. Each layer is made up of a subset of the set of nodes. The nodes in hidden layers may be fully connected to all nodes in the previous layer and provide their output to all nodes in the next layer. The nodes in a single layer may function independently of each other (i.e., do not share connections). Nodes in the output provide the transformed input to the requesting process. In some examples, the neural network is a convolutional neural network, which is a neural network that is not fully connected. Convolutional neural networks can also make use of pooling or max-pooling to reduce the dimensionality (and hence complexity) of the data that flows through the neural network and thus this can reduce the level of computation required. This makes computation of the output in a convolutional neural network faster than in neural networks.

The memory 230 may include any type of storage device that stores information in a format that can be read and/or executed by the processor(s) 250. The memory 230 may store applications and modules that, when executed by the processor(s) 250, perform certain operations. In some examples, the applications and modules may be stored in an external storage device and loaded into the memory 230.

In some implementations, the computing device 200 may access additional resources 210 to, for example, facilitate the identification of objects captured within the field of view of the computing device 200, determine quantities of the objects, track actions of a user within the field of view, interpret voice commands of the user, determine a name of a recipe for a dish based on the identified objects, transcribe the recipe for written publication, and the like. In some implementations, the additional resources 210 may be accessible to the computing device 200 via the network 206 and/or within the external resources 202. In some implementations, the additional resources may be available within the computing device 200. The additional resources 210 may include, for example, one or more databases, one or more ML models, and/or and one or more processing algorithms. In some implementations, the additional resources may include a recognition engine, providing for identification of objects captured within the field of view of the camera 225. In some implementations, the recognition engine may be trained to identify food ingredients. In some implementations, the recognition engine may be trained to identify utensils. In some implementations, the recognition engine may be trained to determine the quantity of the ingredients. In some implementations, the recognition engine may be trained to track the movement of a user's limbs and appendages in the field of view of the camera 225. In some implementations, the recognition engine may be trained to identify the movement of a user's limbs and appendages in the field of view of the camera 225. In some implementations, the recognition engine may be trained to recognize the hand movements of the user to determine an action that is being performed, such as, grabbing, stirring, pouring, pinching, picking, cutting, whisking, etc.

In some implementations, the additional resources 210 may include representation databases including, for example, visual patterns associated with objects, relationships between various objects, and the like. In some implementations, the additional resources may include a search engine to facilitate searching associated with objects and/or entities captured within the field of view of the camera 225, obtaining additional information related to the identified objects, and the like. In some implementations, the additional resources may include a transcription engine, providing for transcription of detected audio commands for processing by the control system 270 and/or the processor(s) 250.

Figure 3A:
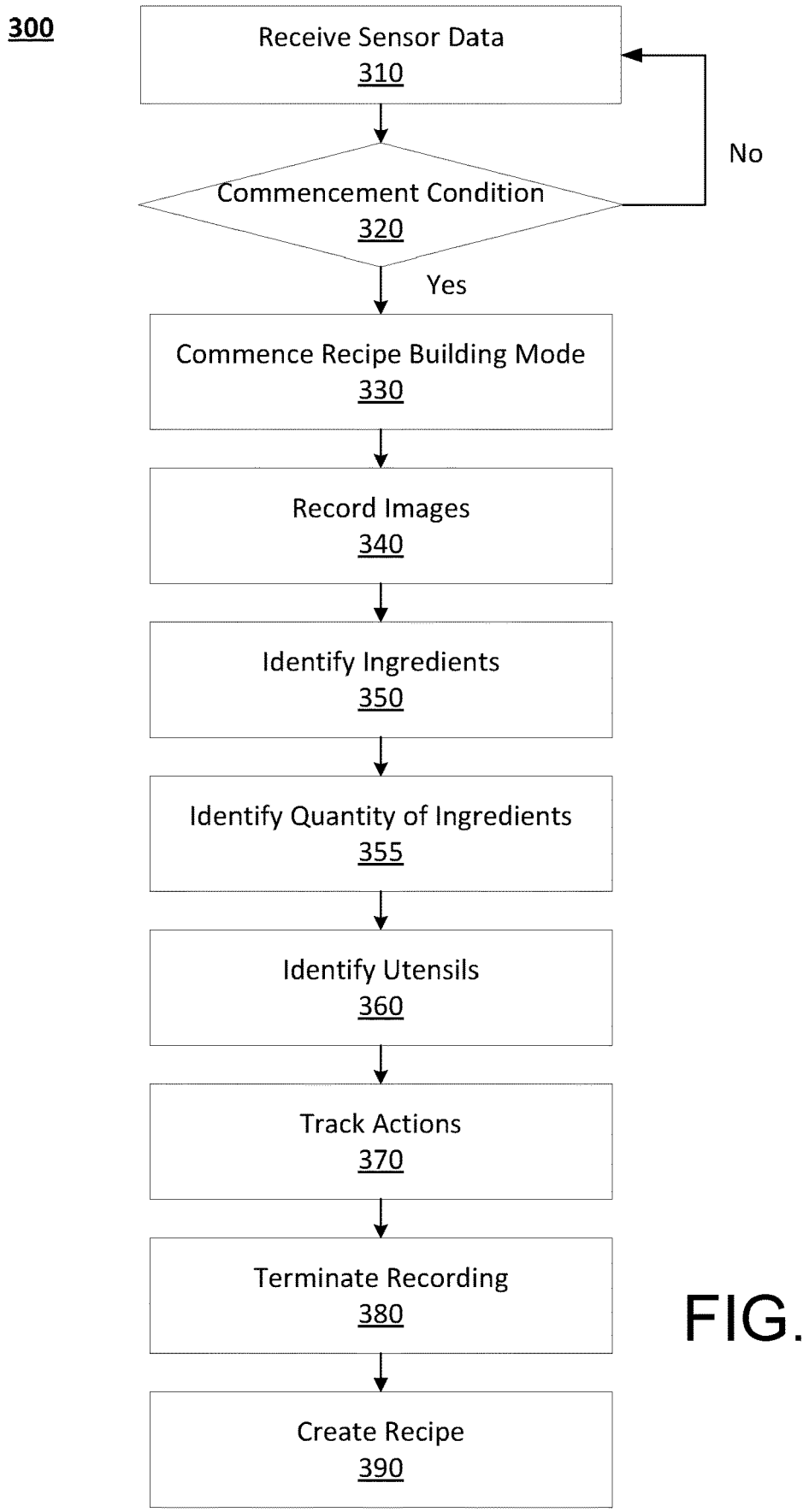
FIGS. 3A-3C are diagrams illustrating examples of a method, in accordance with implementations described herein.
Figure 3B:
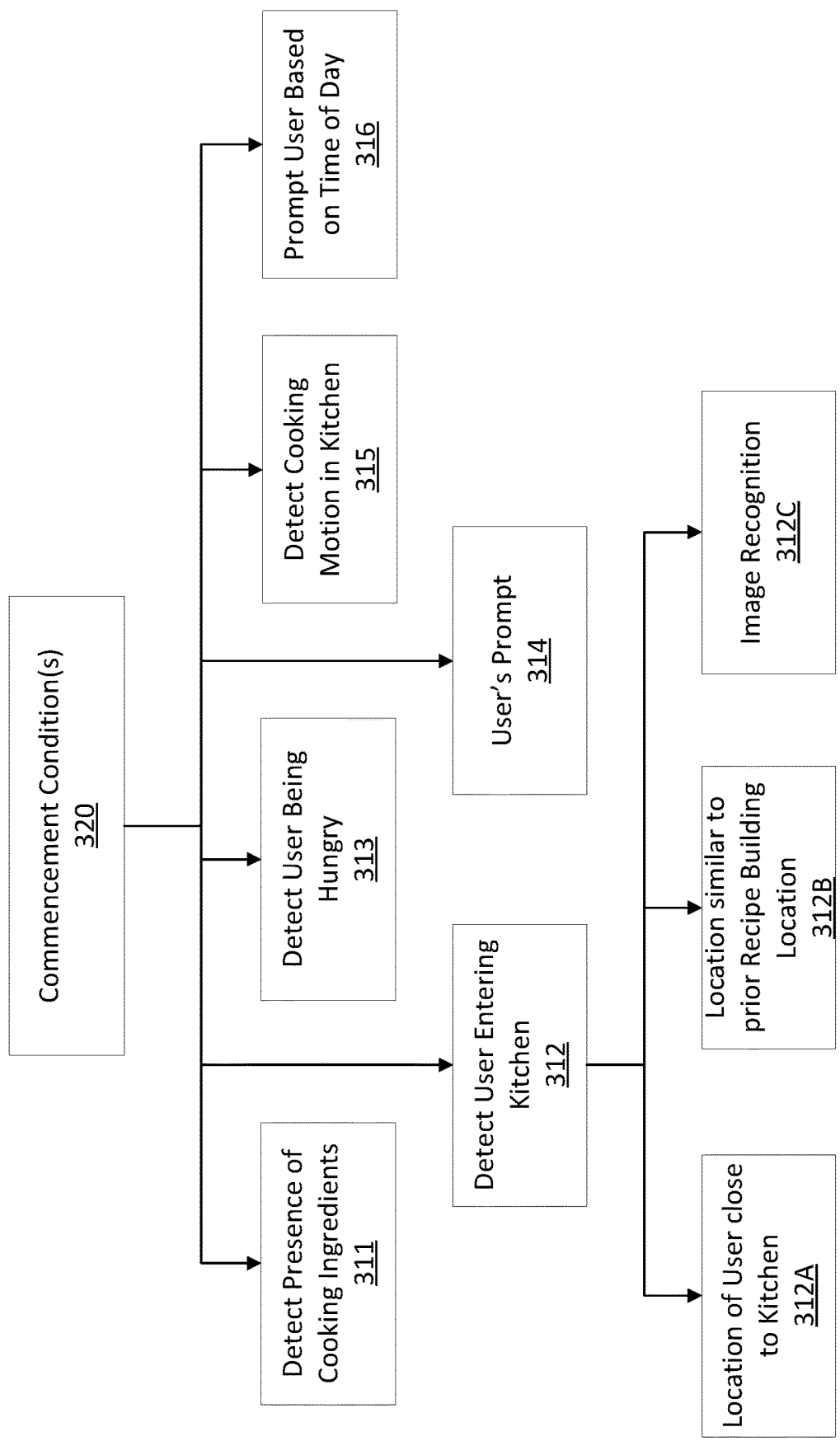
Figure 3C:
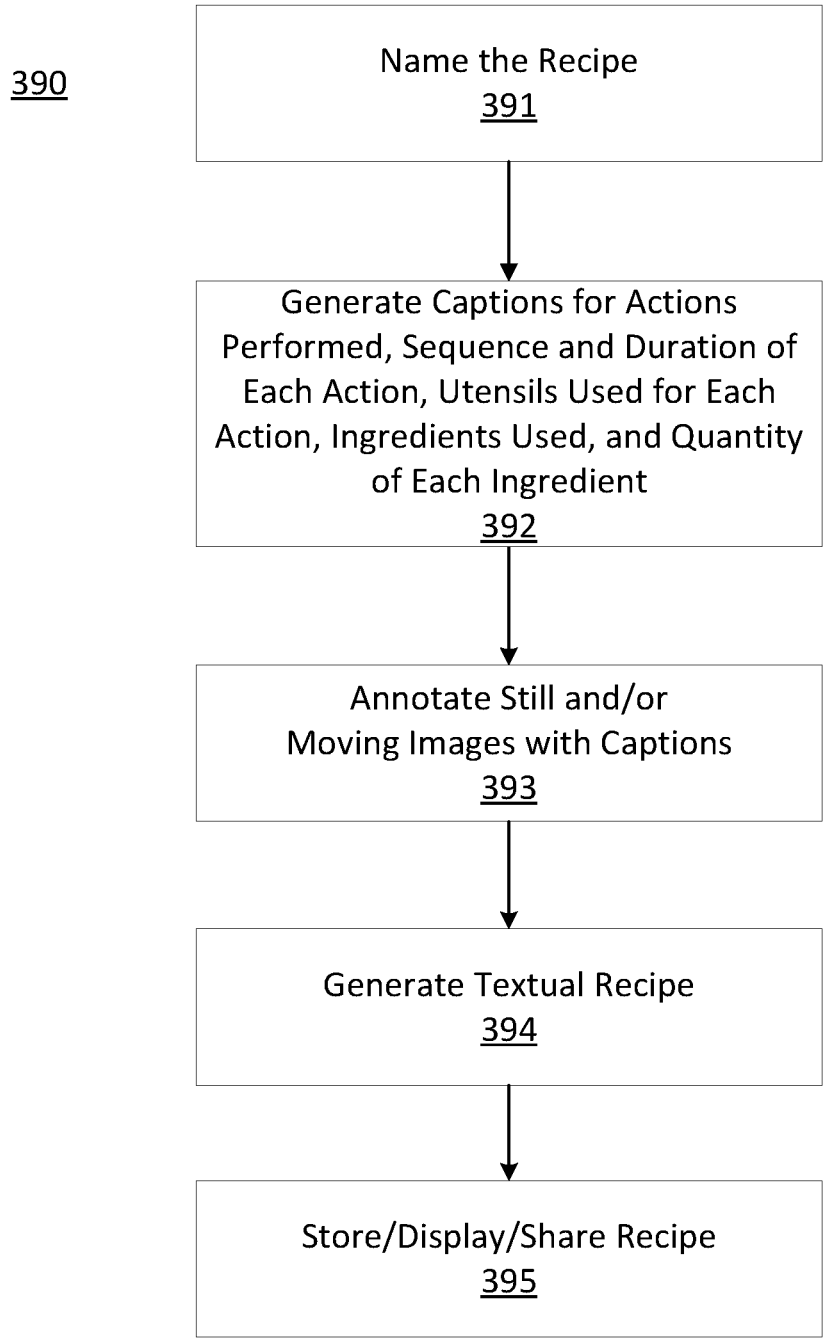

FIGS. 3A-3C illustrate operation of a system and method, in accordance with implementations described herein, in which a recipe is automatically prepared by any one or any combination of the first computing device 100A to the fourth computing device 100D illustrated in FIGS. 1A-2. In the example shown in FIGS. 3A-3C, the system and method are conducted by the user via a head mounted wearable computing device in the form of a pair of smart glasses, simply for purposes of discussion and illustration. The principles to be described herein can be applied to the use of other types of computing devices.

FIG. 3A is a diagram illustrating an example of a method 300 for building a recipe, in accordance with implementations described herein. The method may be implemented by a computing device having processing, image capture, display capability, and access to information related to the identified objects and/or motion events. In the example of FIG. 3A, the systems and methods are conducted via the first computing device 100A, i.e., a head mounted wearable computing device in the form of a pair of smart glasses, simply for purposes of discussion and illustration. The principles to be described herein can be applied to the use of other types of computing devices for the automated preparation of a recipe. Although the FIG. 3A illustrates an example of operations in sequential order, it will be appreciated that this is merely an example, and that additional or alternative operations may be included. Further, the operations of FIG. 3A and related operations may be executed in a different order than that shown, or in a parallel or overlapping fashion.

In operation 310, the computing device (for example, the first computing device 100A or the fourth computing device 100D as described in the examples above, or another computing device having processing and image capture capability) may capture images including multiple objects and/or motion events in a physical environment. In an example, in operation 310, the computing device may receive sensor data from one or more other sensors. An example of other sensor data may be a GPS data identifying the location of the user within the home. The GPS location may be detected by, for example, the first computing device 100A or the fourth computing device 100D. Another example of other sensor data may be sensor data provided by a hunger indicator sensor disposed in for example, the first computing device 100A, the third computing device 100C, or the fourth computing device 100D.

In operation 320, based on the sensor data received, the computing device (for example, the first computing device 100A or the fourth computing device 100D as described in the examples above, or another computing device having processing and display capability) may determine whether a condition for commencement of the recipe building mode has been met or satisfied to commence the recipe building mode of the first computing device 100A. In operation 320, if the commencement condition is met, control passes to operation 330 for commencing the recipe building mode. In operation 320, if the commencement condition is not met for commencing the recipe building mode, the computing device continues to receive sensor data and continues to detect whether the start condition for commencing the recipe building mode is met. Further details regarding the start conditions are described with reference to FIG. 3B below.

In operation 340, an imaging sensor 116 of the first computing device 100A may capture still and/or moving images of external objects in the physical environment within a field of view of the imaging sensor 116.

In some examples, when a sustained gaze or focus is detected by an image sensor of the computing device on a particular arrangement of objects/entities, the first computing device 100A may access resources providing for the identification of multiple objects and/or motion events captured in the still and/or moving images. In some examples, identification or recognition operations by the first computing device 100A may be triggered when the gaze directed at the objects/entities has a duration that is greater than or equal to a threshold duration/preset amount of time.

The resources for identifying the multiple objects and/or motion events in the physical environment may be available locally on the first computing device 100A and/or may be provided to the first computing device 100A from external resources accessible via a network. In some examples, the head mounted wearable computing device may store the still and/or moving images of external objects in any one or any combination of the memory 230, the external devices 204, the external resources 202, and/or the additional resources 210.

In operation 350, the at least one processor 250 of the first computing device 100A may identify whether one or more ingredients is included within the image data. In some examples, the at least one processor 250 may receive the image data from the imaging sensor 116 on the first computing device 100A. In some examples, the microcontroller 255 is configured to execute a machine-learning (ML) model 290 to perform an inference operation related to image processing to identify the one or more ingredients using the image data from the imaging sensor 116. In some examples, the microcontroller 255 is configured to perform an inference operation by invoking the ML model 290 (using the image data from the imaging sensor 116 as an input to the ML model 290) to detect and identify the one or more ingredient such as, for example, the one or more of the ingredients shown in FIG. 4A, i.e., 411, 412, 413, 414, 415, 416, 417, 416, etc.

In some examples, a small ML model 290 may be configured to detect whether or not an object of interest (e.g., text, OCR code, label text, or barcodes, etc.) is included within the image data captured by the imaging sensor 116. The microcontroller 255 may be configured to perform an inference operation by invoking another ML model 290 (using text, OCR code, label text, or barcodes as an input to the ML model 290) to detect the one or more ingredient. In another example, the at least one processor 250 may obtain from a search engine in communication with the first computing device 100A, information related to the one or more ingredients relating to the text data or the OCR data. The search engine may accept any one or any combination of the text data, barcodes, label, or OCR data as an input.

Figure 4A:
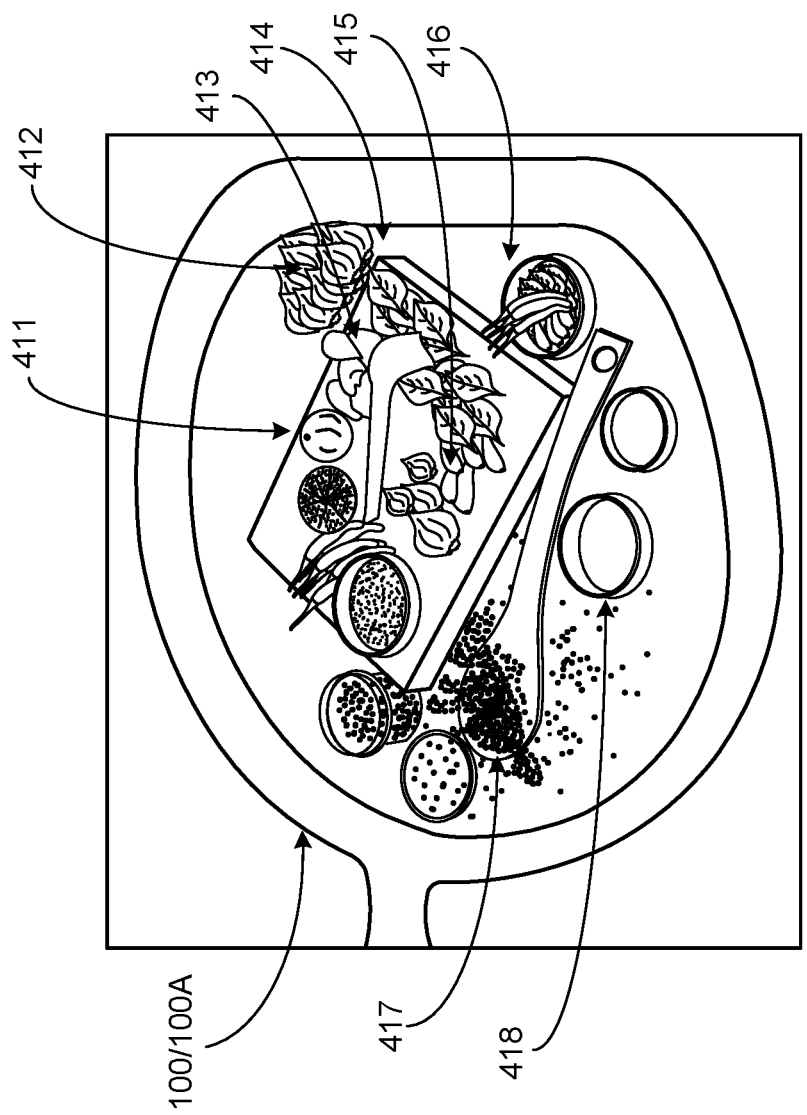
FIG. 4A illustrates an example operation of identifying ingredients by an example computing device, in accordance with implementations described herein.

In some examples, the at least one processor 250 may obtain from a search engine in communication with the first computing device 100A, information related to the calorific content of the one or more ingredients such as, for example, the one or more of the ingredients shown in FIG. 4A, i.e., 411, 412, 413, 414, 415, 416, 417, 416, etc. The information may be available locally on the first computing device 100A and/or may be provided to the computing device from external resources in communication with the first computing device 100A via a network. In some examples, the information may be obtained by a search engine conducting a search of one or more databases to obtain the information provided to the first computing device 100A.

In some implementations, the information regarding the calorific content may be output to a user of the first computing device 100A via a display 101 of the first computing device 100A. In some implementations, the information regarding the calorific content may be output to the user via an audio output device 106 of the first computing device 100A.

In some examples, the first computing device 100A may provide visual or auditory feedback to the user that it has recognized the ingredient. In some implementations, the ingredient may be output to the user of the first computing device 100A via a display 101 of the first computing device 100A, where a name of the ingredient is overlaid on the optical-see-through screen of the first computing device 100A. In some implementations, the information may be output to the user via an audio output device 106 of the first computing device 100A.

In some examples, the first computing device 100A may prompt the user to verify the identified ingredient via a message on the display of the first computing device 100A or via voice prompt. In an example, the user may provide a response in the form of, for example, a touch input, a gesture input, an audible input (detected by the audio input device 107), and other such user inputs.

In operation 355, the at least one processor 250 of the first computing device 100A may identify a quantity of the one or more ingredients included within the image data such as, for example, the one or more of the ingredients shown in FIG. 4A, i.e., 411, 412, 413, 414, 415, 416, 417, 416, etc. In some examples, the at least one processor receives the image data from the imaging sensor 116 on the first computing device 100A. In some examples, the microcontroller 255 is configured to execute a machine-learning (ML) model 290 to perform an inference operation related to image processing to identify the quantity of the one or more ingredient using the image data from the imaging sensor 116. In some examples, the microcontroller 255 is configured to perform an inference operation by invoking the ML model 290 (using the image data from the imaging sensor 116 as an input to the ML model 290) to determine the quantity of the one or more ingredient such as, for example, the one or more of the ingredients shown in FIG. 4A, i.e., 411, 412, 413, 414, 415, 416, 417, 416, etc.

In some examples, the first computing device 100A may provide visual or auditory feedback to the user that it has determined the quantity of the ingredient used. In some implementations, the quantity of the ingredient used may be output to the user of the first computing device 100A via a display 101 of the first computing device 100A, where a name of the ingredient and its quantity is overlaid on the optical-see-through screen of the first computing device 100A. In some implementations, the information may be output to the user via an audio output device 106 of the first computing device 100A.

In operation 360, the at least one processor 250 of the first computing device 100A may identify whether one or more utensil is included within the image data. The at least one processor 250 may receive the image data from the imaging sensor 116 on the first computing device 100A. In some examples, the microcontroller 255 is configured to execute a machine-learning (ML) model 290 to perform an inference operation related to image processing to identify the one or more utensils using the image data from the imaging sensor 116. For example, the microcontroller 255 is configured to perform an inference operation by invoking the ML model 290 (using the image data from the imaging sensor 116 as an input to the ML model 290) to detect the one or more utensils such as, for example, the one or more utensils shown in FIG. 4B, i.e., 421, 422, 423, 424, 425, etc. In some examples, a small ML model 290 is configured to detect whether or not an object of interest (e.g., text, OCR code, label text, barcodes, etc.) are included within the image data captured by the imaging sensor 116. In another example, the microcontroller 255 may be configured to perform an inference operation by invoking another ML model 290 (using text data or OCR data as an input to the ML model 290) to detect the one or more utensil such as, the one or more utensils shown in FIG. 4B, i.e., 421, 422, 423, 424, 425, etc. In another example, the at least one processor 250 may obtain from a search engine, using text, OCR code, label text, or barcodes as an input, in communication with the first computing device 100A, information related to the one or more utensils identified in the images.

In some examples, the first computing device 100A may provide visual or auditory feedback to the user that it has recognized the utensil. In some implementations, the utensil may be output to the user of the first computing device 100A via a display 101 of the first computing device 100A, where a name of the utensil is overlaid on the optical-see-through screen of the first computing device 100A. In some implementations, a picture of the utensil may be overlaid on the optical-see-through screen of the first computing device 100A. In some implementations, the information may be output to the user via an audio output device 106 of the first computing device 100A.

In some examples, the first computing device 100A may prompt the user to verify the identified ingredient or utensil via a message on the display of the first computing device 100A or via voice prompt. In an example, the user may provide a response in the form of, for example, a touch input, a gesture input, an audible input (detected by the audio input device 107), and other such user inputs.

In operation 370, the at least one processor 250 of the first computing device 100A may detect and track movements of limbs and appendages of a user in the image data. The at least one processor 250 may receive the image data from the imaging sensor 116 on the first computing device 100A. In some examples, the at least one processor 250 may include a small ML model that detects and tracks regions of interest of objects in the image data, e.g., objects such as limbs and appendages of a user. The first computing device 100A may include a more powerful object detector that executes a larger ML model to calculate object location data (e.g., bounding box dataset) that identifies a location of the detected object of interest. In some examples, the object detector may be installed on another communication device, such as, e.g., fourth computing device 100D, which is in communication with the first computing device 100A via the communication module 280. In some implementations, the detecting and tracking regions of interest of objects in the image data may be distributed between the fourth computing device 100D and the first computing device 100A.

In some examples, the first computing device 100A uses one or more tracking mechanisms, e.g., IMU-based warping, blob detection, optical flow, etc.) to propagate the object location data for subsequent image frames captured on the first computing device 100A to track the actions of the user.

In some examples, the microcontroller 255 is configured to execute a ML model 290 to recognize the hand movements of the user to determine an action that is being performed, such as, chopping, kneading, mixing, sprinkling, grabbing, stirring, pouring, pinching, picking, cutting, whisking, etc. In some examples, the microcontroller 255 is configured to execute a ML model 290 to recognize actions such as, putting one or more ingredients on a skillet, placing a utensil in an oven, removing a utensil from a stove burner, etc.

Figure 4B:
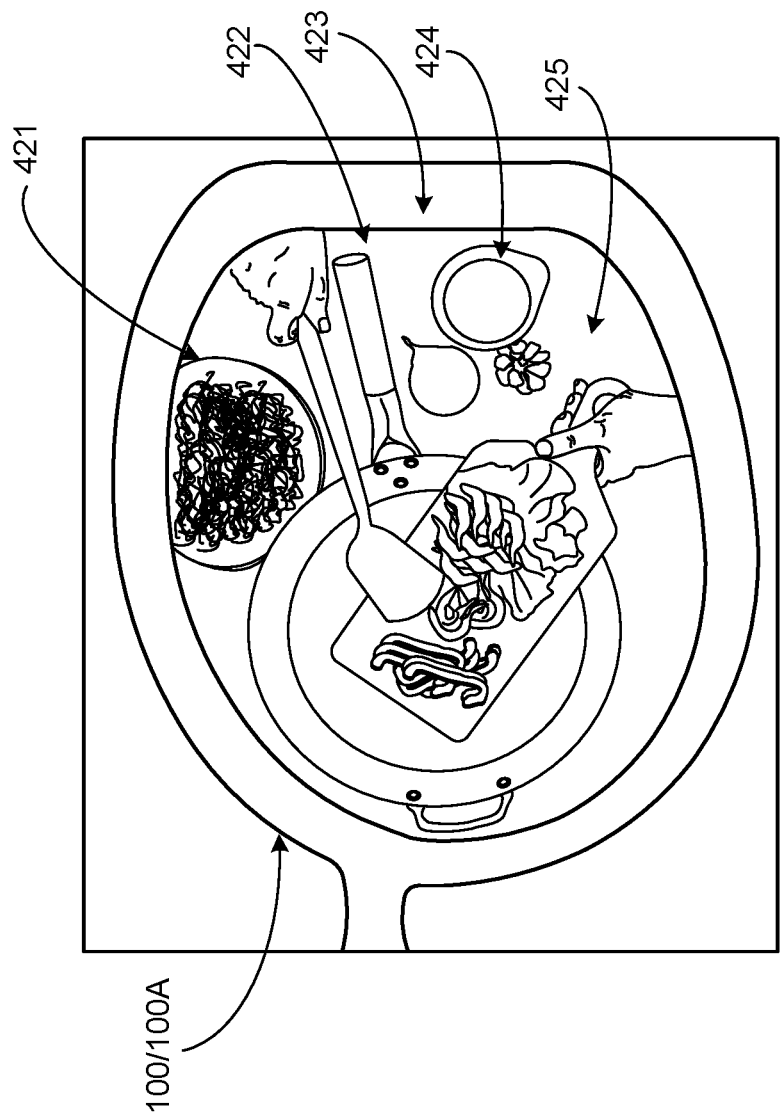
FIG. 4B illustrates an example operation of identifying utensils by an example computing device, in accordance with implementations described herein.
Figure 4C:
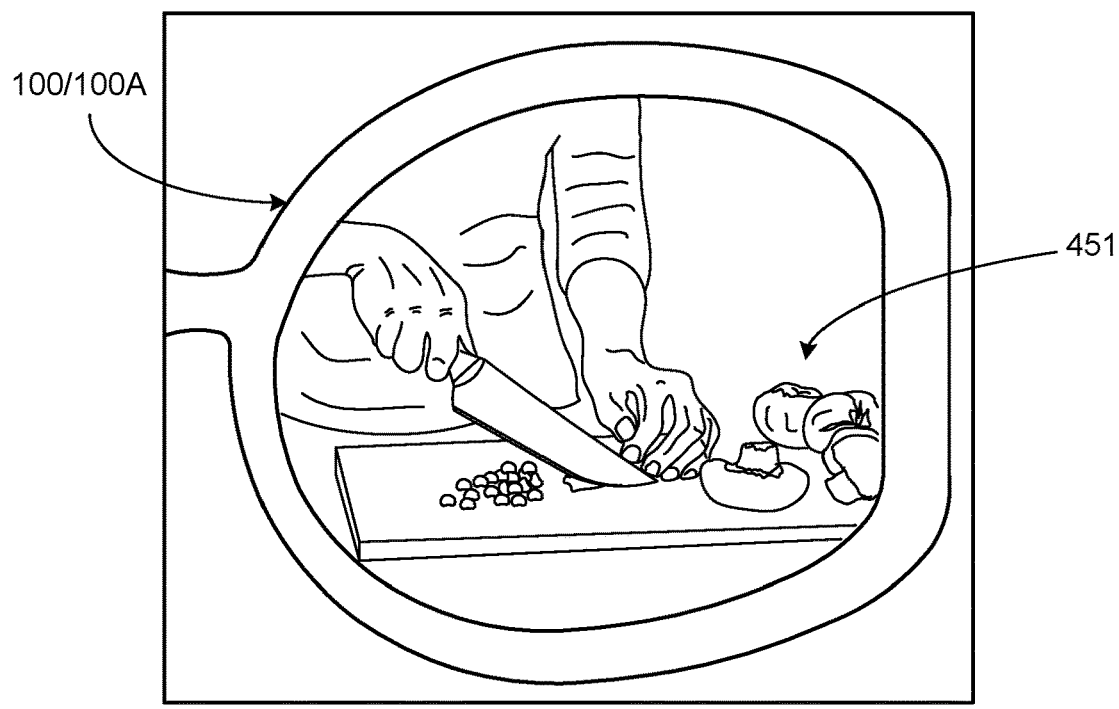
FIGS. 4C-4H illustrate example operations of recognizing hand movements of the user to determine an action that is being performed by an example computing device, in accordance with implementations described herein.
Figure 4D:
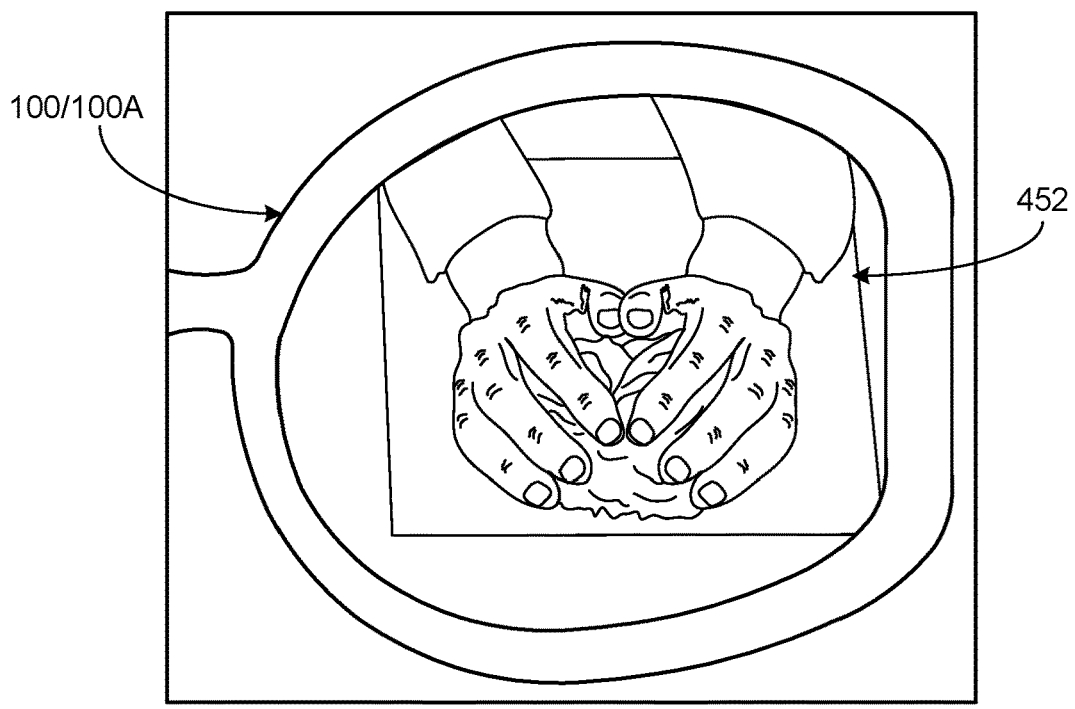
Figure 4E:
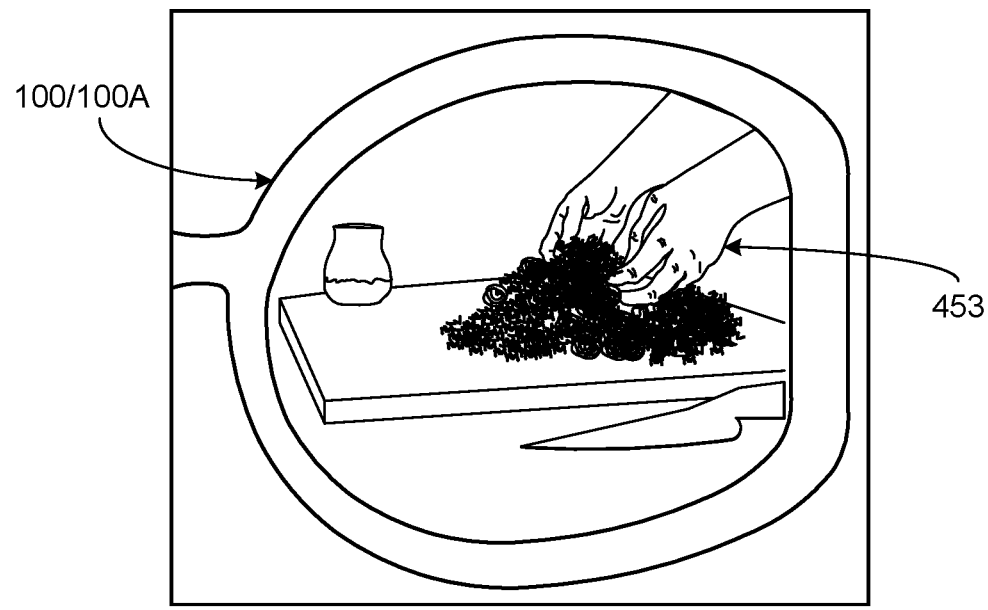
Figure 4F:
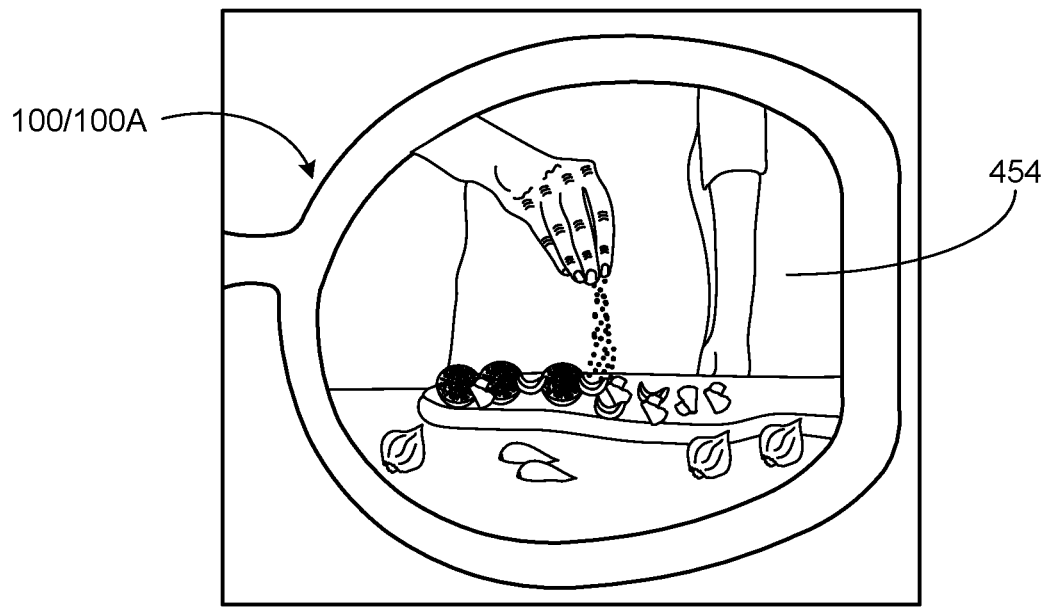
Figure 4G:
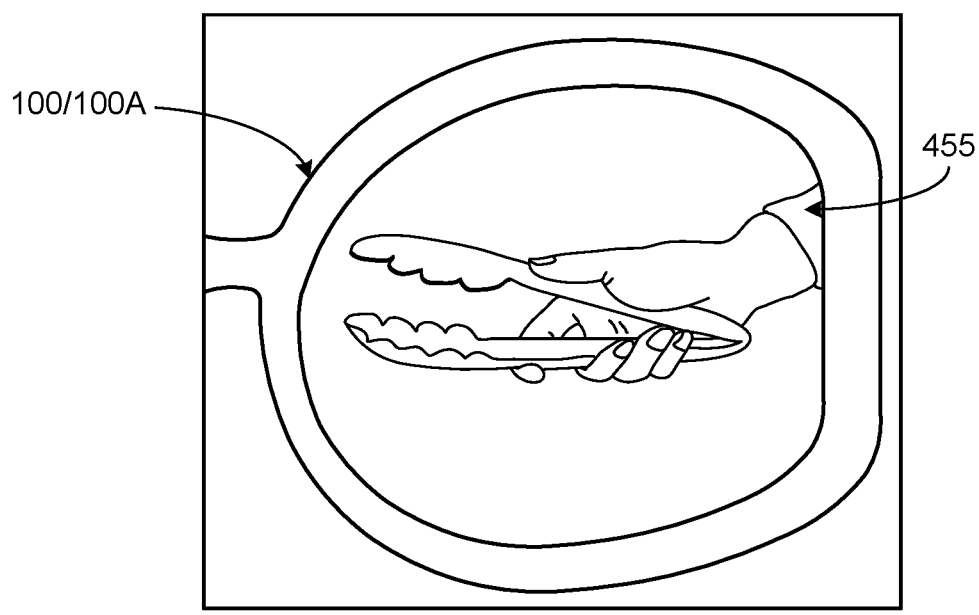
Figure 4H:
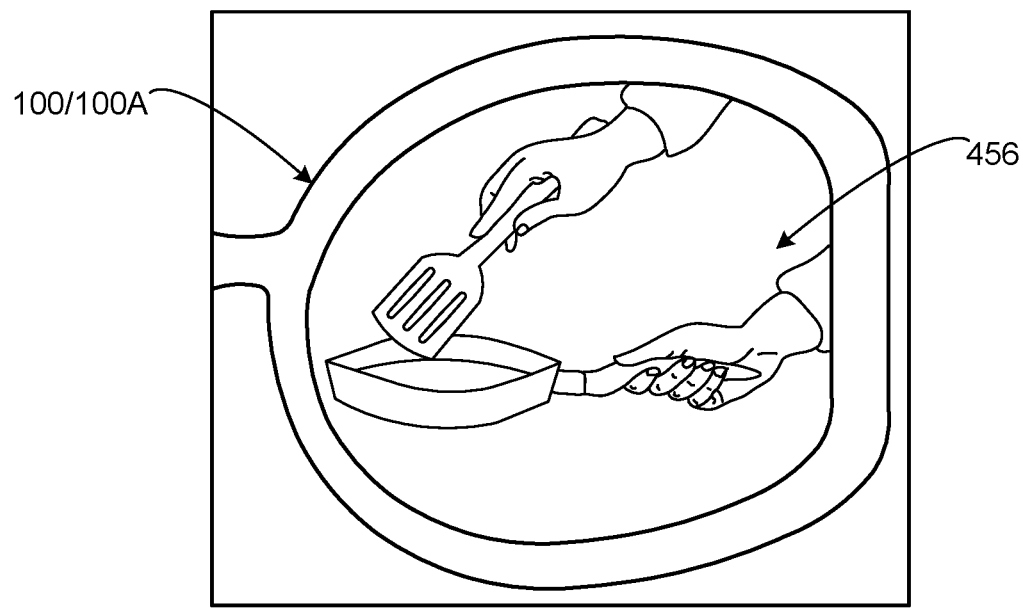

FIG. 4C illustrates an example operation of recognizing hand movements of the user to determine an action that is being performed is chopping 451. FIG. 4D illustrates an example operation of recognizing hand movements of the user to determine an action that is being performed is kneading 452. FIG. 4E illustrates an example operation of recognizing hand movements of the user to determine an action that is being performed is mixing 453. FIG. 4F illustrates an example operation of recognizing hand movements of the user to determine an action that is being performed is sprinkling 454. FIG. 4G illustrates an example operation of recognizing hand movements of the user to determine an action that is being performed is grabbing 455. FIG. 4H illustrates an example operation of recognizing hand movements of the user to determine an action that is being performed is stirring 456.

In some examples, one or more inertial sensors installed in another wearable device (such as the third computing device 100C) and the microcontroller 255 configured to execute a ML model 290 may work collaboratively to recognize the hand movements of the user to determine an action that is being performed, such as, chopping, kneading, mixing, sprinkling, grabbing, stirring, pouring, pinching, picking, cutting, whisking, etc. In an example, the microcontroller 255 is configured to perform an inference operation by invoking the ML model 290 (using the image data from the imaging sensor 116 and the data output from one or more of the accelerometer, the gyroscope, and the magnetometer, and the like included in an IMU as an input to the ML model 290) to recognize the hand movements of the user to determine an action that is being performed, such as, chopping, kneading, mixing, sprinkling, grabbing, stirring, pouring, pinching, picking, cutting, whisking, etc.

In some examples, the plurality of markers 125 in the third computing device 100C may be detectable by the first computing device 100A, for example, by the outward facing imaging sensor 116 or the one or more image sensors 119 of the first computing device 100A, to provide data for the detection and tracking of the position and/or orientation of the third computing device 100C relative to the first computing device 100A. Data for the detection and tracking of the position and/or orientation of the third computing device 100C relative to the first computing device 100A and the microcontroller 255 configured to execute a ML model 290 may be together configured to recognize the hand movements of the user to determine an action that is being performed In some examples, the sequence of action detected by the ML model 290 is stored in any one or any combination of the memory 230, the external devices 204, the external resources 202, and/or the additional resources 210. In some examples, the stored sequence of action may be translated as digital information and stored as steps in a recipe.

In some examples, the at least one processor 250 of the first computing device 100A may implement a software stopwatch to capture and record the time spent on each action of the user. In some examples, the at least one processor 250 of the first computing device 100A may implement a software stopwatch to capture and record the time that elapsed between each action of the user. In some examples, the at least one processor 250 of the first computing device 100A may record the time when each action of the user was performed. In an example, the time recorded for the action may be stored in any one or any combination of the memory 230, the external devices 204, the external resources 202, and/or the additional resources 210.

In operation 380, the first computing device 100A may terminate the capture of the still and/or moving images of external objects in the physical environment by the imaging sensor 116 of the first computing device 100A. In some examples, the termination of the capture of the still and/or moving images is based on an inference of a machine-learning (ML) model 290. In some examples, the microcontroller 255 is configured to execute the ML model 290 to perform an inference operation related to image processing to determine whether the cooking activity is being carried out or has concluded.

In some examples, the first computing device 100A may terminate the capture of the still and/or moving images of external objects in the physical environment by the imaging sensor 116 of the first computing device 100A in response to a user prompt. In an example, the user prompt may be in the form of, for example, a touch input, a gesture input, an audible input (detected by the audio input device 107), and other such user inputs. In an example, the user prompt may be an utterance such as "stop tracking" or "done cooking" to stop the recipe building mode.

In operation 390, the at least one processor 250 of the first computing device 100A may create the recipe. In an example, the creating of the recipe may include naming the recipe, annotating the still and the moving images that are recorded, identifying actions performed, identifying the sequence and duration of each action, identifying the utensils used for each action, identifying the ingredients used, and identifying the quantity of each ingredient. Further details regarding the creation of the recipe are described with reference to FIG. 3C below.

FIG. 3B illustrates examples of commencement conditions for the recipe building mode described in operation 320 of the computing device (for example, the first computing device 100A or the fourth computing device 100D as described in the examples above, or another computing device having processing and display capability). In some examples, at least one processor 250 of the first computing device 100A may commence the recipe building mode of the first computing device 100A based on one or more of the operations described below.

In operation 311, the at least one processor 250 receives the image data from the imaging sensor 116 on the first computing device 100A. In some examples, the microcontroller 255 is configured to execute a machine-learning (ML) model 290 to perform an inference operation related to image processing to identify one or more ingredients using the image data from the imaging sensor 116. In some examples, the microcontroller 255 is configured to perform an inference operation by invoking the ML model 290 (using the image data from the imaging sensor 116 as an input to the ML model 290) to detect one or more ingredients in the image data. In some examples, the at least one processor 250 of the first computing device 100A may commence the recipe building mode of the first computing device 100A when one or more one or more ingredients is detected in the image data.

In operation 312, the at least one processor 250 receives the image data from the imaging sensor 116 on the first computing device 100A and sensor data from one or more other sensors on the first computing device 100A. An example of other sensor data may be a GPS data identifying the location of the user within the home. The GPS location may be detected by, for example, the first computing device 100A or the fourth computing device 100D.

Figure 4I:
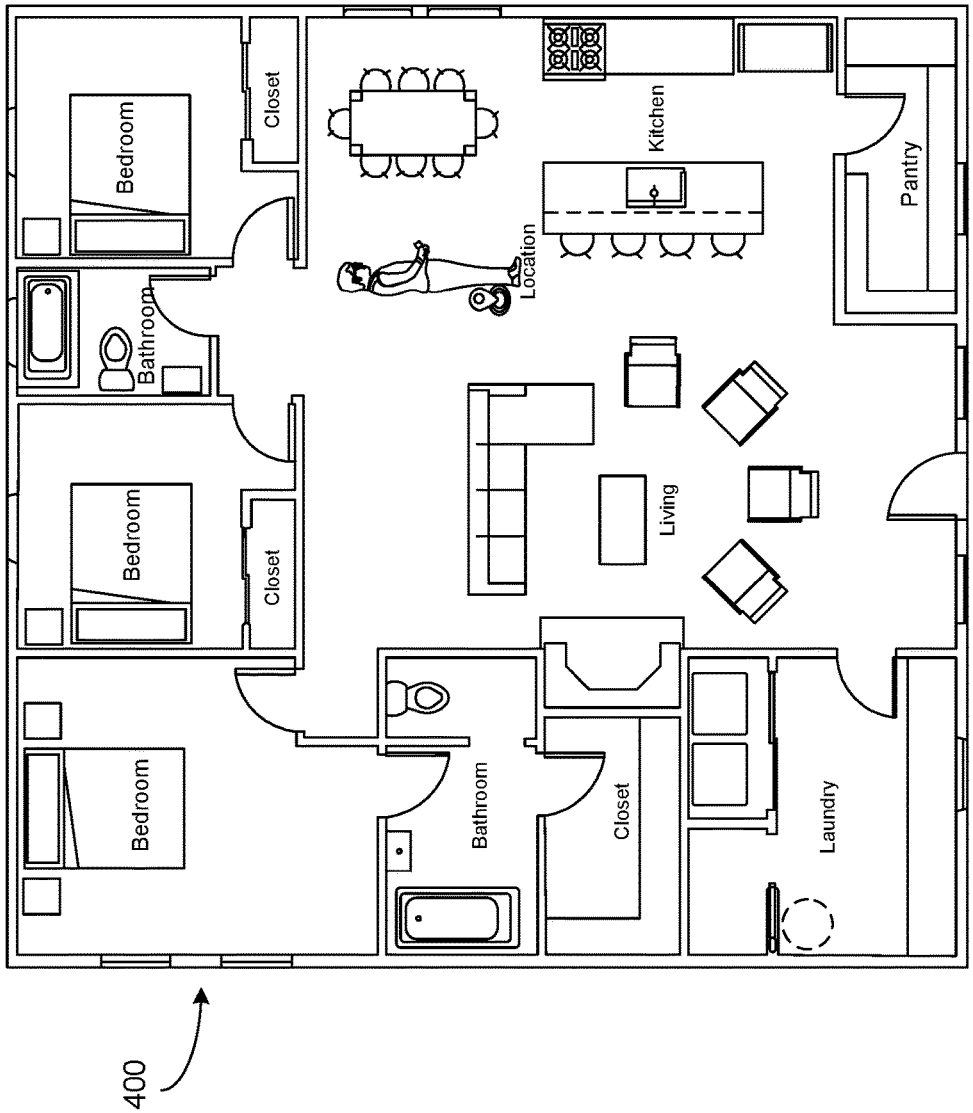
FIG. 4I illustrates an example operation of identifying a location of a user conducted by an example computing device, in accordance with implementations described herein.

In operation 312A, the at least one processor 250 receives the GPS data identifying the location of the user within the home. The GPS location may be detected by, for example, the first computing device 100A or the fourth computing device 100D. As shown in FIG. 4I, the location of the user in the home 400 is provided by a GPS sensor in the first computing device 100A or the fourth computing device 100D. In some examples, the at least one processor 250 of the first computing device 100A may commence the recipe building mode of the first computing device 100A when the location of the user indicates that the user is near or proximate to the kitchen.

In operation 312B, the at least one processor 250 receives the GPS data identifying the location of the user. The GPS location may be detected by, for example, the first computing device 100A or the fourth computing device 100D. In some examples, the at least one processor 250 of the first computing device 100A may commence the recipe building mode of the first computing device 100A when the location of the user indicates that the user is close or proximate to a location where the user previously created a recipe.

Figure 4J:
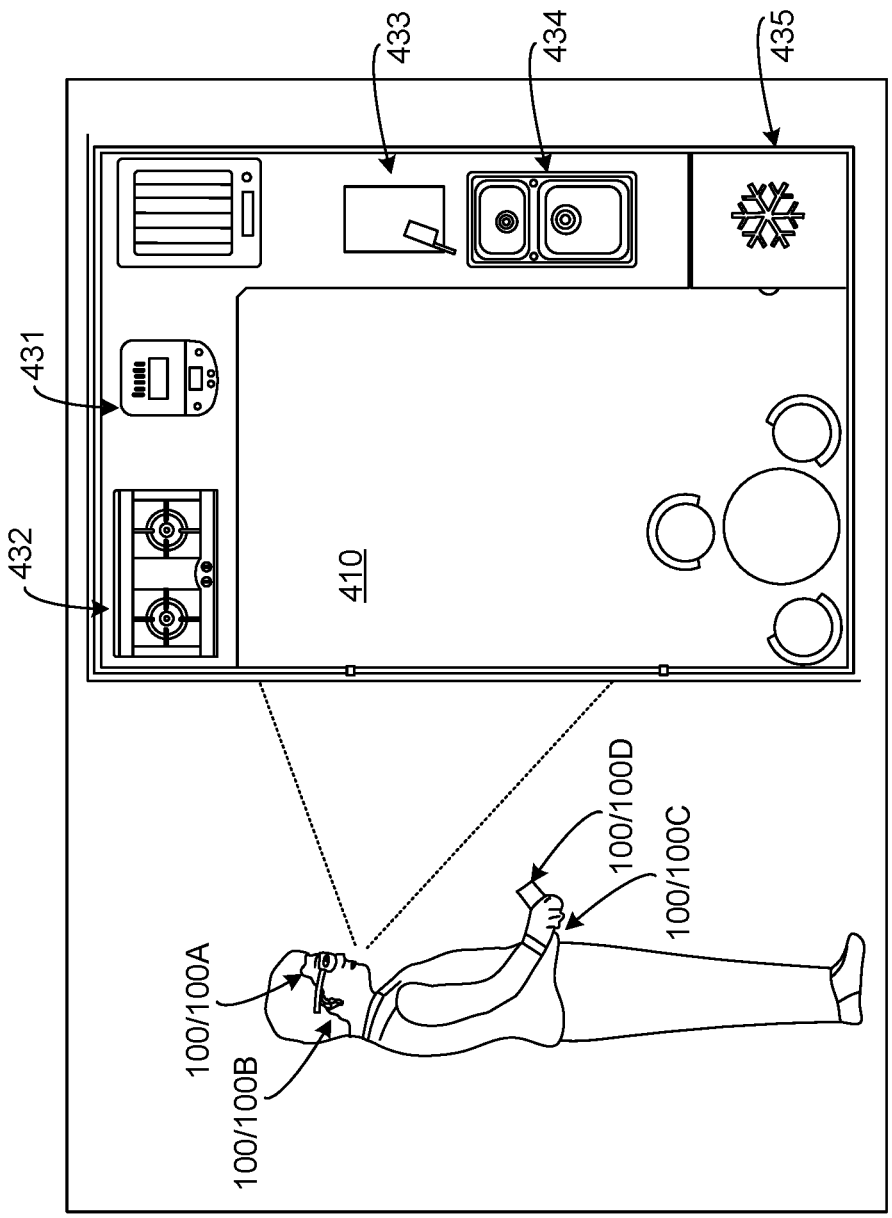
FIG. 4J illustrates an example operation of identifying a location of a user conducted by an example computing device, in accordance with implementations described herein.

In operation 312C, the at least one processor 250 receives the image data from the imaging sensor 116 on the first computing device 100A. In some examples, the microcontroller 255 is configured to execute a machine-learning (ML) model 290 to perform an inference operation related to image processing to identify one or more objects using the image data from the imaging sensor 116. As shown in FIG. 4J, the one or more objects may be kitchen appliances such as, toaster 431, cooktop 432, chopping board 433, kitchen sink 434, and refrigerator 435. The presence of one or more of the kitchen appliances may indicate that the user is located near a kitchen 410 of the home.

In another example, the one or more objects identified may be one or more of the kitchen utensils such as 421, 422, 423, 424, 425, etc. shown in FIG. 4B. The presence of the one or more kitchen utensils may indicate that the user is located near a kitchen 410 of the home. In another example, the one or more objects identified may be one or more of the ingredients such as 411, 412, 413, 414, 415, 416, 417, 416, etc. shown in FIG. 4A. The presence of the one or more ingredients may indicate that the user is located near a kitchen 410 of the home. In another example, some combination of the one or more kitchen appliances, the one or more kitchen utensils, and the one or more ingredients may indicate that the user is located near a kitchen 410 of the home.

In operation 313, the at least one processor 250 of the first computing device 100A may receive a signal from the one or more hunger sensors 227 that the user is hungry. Based on the signal, the at least one processor 250 may determine that the user of the first computing device 100A is hungry. In some examples, the at least one processor 250 of the first computing device 100A may commence the recipe building mode of the first computing device 100A when the user is hungry.

In operation 314, the at least one processor 250 of the first computing device 100A may detect user input, in the form of, for example, a touch input, a gesture input, an audible input (detected by the audio input device 107), and other such user inputs. In some examples, the at least one processor 250 of the first computing device 100A may commence the recipe building mode of the first computing device 100A when the user input is received.

In some examples, the first computing device 100A may include a voice command detector that executes a ML model to continuously or periodically process microphone samples for a hot-word (e.g., "track recipe," "ok G" or "ok D"). In some examples, the at least one processor 250 of the first computing device 100A may commence the recipe building mode of the first computing device 100A when the hot-word is recognized.

In some examples, the first computing device 100A may include a voice command detector that executes a small ML model (e.g., a gatekeeping model) to continuously or periodically process microphone samples for an initial portion of a hot-word (e.g., "track recipe," "ok G" or "ok D"). If the voice command detector detects that initial portion, the voice command detector may cause a buffer to capture the subsequent audio data. Also, the first computing device 100A may transmit a portion of the buffer (e.g., 1-2 seconds of audio from the head of the buffer) to the fourth computing device 100D over the wireless connection, where the fourth computing device 100D includes a hot-word recognition engine having a larger ML model to perform the full hot-word recognition. If the utterance is a false positive, the fourth computing device 100D may transmit a disarm command to the first computing device 100A, which discards the contents of the buffer. If the utterance is a true position, the rest of the audio buffer is transmitted to the fourth computing device 100D for automatic speech recognition.

In operation 315, the at least one processor 250 receives the GPS data identifying the location of the user. The GPS location may be detected by, for example, the first computing device 100A or the fourth computing device 100D. In some examples, when the user is in the kitchen, the microcontroller 255 is configured to execute a ML model 290 to recognize the hand movements of the user to determine an action that is being performed, such as, grabbing, chopping, stirring, pouring, pinching, picking, cutting, whisking, chopping, etc. In some examples, the at least one processor 250 of the first computing device 100A may commence the recipe building mode of the first computing device 100A when the location of the user indicates that the user is in the kitchen and the action of the user indicates a cooking motion.

In operation 316, the at least one processor 250 of the first computing device 100A may track the time of the day and/or the day of the week that the user usually cooks. In some examples, the at least one processor 250 of the first computing device 100A may prompt the user whether to commence the recipe building mode based on a time of day that the user usually cooks, or a day of the week that the user usually cooks. In some examples, the at least one processor 250 of the first computing device 100A may commence the recipe building mode of the first computing device 100A based on user response. The user response may be in the form of, for example, a touch input, a gesture input, an audible input (detected by the audio input device 107), and other such user inputs.

FIG. 3C is a diagram illustrating an example of a method for creating a recipe as described in operation 390, in accordance with implementations described herein. The method may be implemented by a computing device having processing, image capture, and display capability. In the example of FIG. 3C, the systems and methods are conducted via the first computing device 100A, i.e., a head mounted wearable computing device in the form of a pair of smart glasses, simply for purposes of discussion and illustration. The principles to be described herein can be applied to the use of other types of computing devices for the automated preparation of a recipe. Although the FIG. 3C illustrates an example of operations in sequential order, it will be appreciated that this is merely an example, and that additional or alternative operations may be included. Further, the operations of FIG. 3C and related operations may be executed in a different order than that shown, or in a parallel or overlapping fashion.

In operation 391, the name of the recipe may be based on any one or any combination of the captured still and/or moving images, the one or more ingredient, the quantity of the one or more ingredient, the one or more cooking utensils, the actions of the user during cooking, the time taken for each of the actions, and the time between each action of the user. In some examples, the microcontroller 255 is configured to execute a machine-learning (ML) model 290 to perform an inference operation related to natural language processing to infer the name of the recipe based on the one or more of the ingredient, the quantity of the one or more ingredient, the one or more cooking utensils, the actions of the user during cooking, the time taken for each of the actions, and the time between each action of the user being provided as an input to the ML model 290. In some examples, the name of the recipe is provided to the user and a confirmation of the name is received from the user, in the form of, for example, a touch input, a gesture input, an audible input (detected by the audio input device 107), and other such user inputs. In some examples, the name of the recipe is received as user input, in the form of, for example, a touch input, a gesture input, an audible input (detected by the audio input device 107), and other such user inputs.

In operation 392, captions may be generated for the actions performed, the sequence and duration of each action, the utensils used for each action, the ingredients used, and the quantity of each ingredient. In some examples, the microcontroller 255 is configured to execute a machine-learning (ML) model 290 to perform an inference operation related to inferring captions from input images. In an example, the actions performed, the sequence and duration of each action, the utensils used for each action, the ingredients used, and the quantity of each ingredient is provided as an input for the ML model 290 and corresponding text captions are obtained from the ML model 290.

In an example, the captions may be generated after the still and/or moving images have been converted to textual data. In some examples, first computing device 100A may transmit the textual data for the still and/or moving images, the actions performed, the sequence and duration of each action, the utensils used for each action, the ingredients used, and the quantity of each ingredient to the fourth computing device 100D or a server computer provided in the external resources 202. In some examples, the fourth computing device 100D or the server computer provided in the external resources 202 may execute a larger ML model to convert the input data to caption. In an example, the caption data may be routed back to the first computing device 100A for storage and/or display. The text captions may be stored in any one or any combination of the memory 230, the external devices 204, the external resources 202, and/or the additional resources 210.

In operation 393, in some examples, the still and/or moving images are annotated with the captions that are generated in operation 392 to create an annotated recipe. In an example, the captions may be inserted in the still and/or moving images at the time that was recorded and stored for the respective action in operation 370.

In operation 394, textual representation of the recipe is generated. In some examples, the microcontroller 255 is configured to generate a textual representation of the recipe. In some examples, annotated still and/or moving images, the captions for actions performed, the sequence and duration of each action, the time when each action was performed, the utensils used for each action, the ingredients used, and the quantity of each ingredient is provided to the microcontroller 255 and the textual representation for the recipe is obtained. In some examples, annotated still and/or moving images, the captions for actions performed, the sequence and duration of each action, the time when each action was performed, the utensils used for each action, the ingredients used, the quantity of each ingredient, and the calorific content of each ingredient is provided to the microcontroller 255 and the textual representation for the recipe is obtained. In some examples, the microcontroller 255 is configured to execute a machine-learning (ML) model 290 to perform an inference operation related to generating a textual representation of the recipe.

In operation 395, any one or any combination of the annotated recipe and the textual recipe may be stored in any one or any combination of the memory 230, the external devices 204, the external resources 202, and/or the additional resources 210. In some examples, any one or any combination of the annotated recipe and the textual recipe may be shared with the user's friend, social media community, group, social media group.

The smart glasses may facilitate the unobtrusive viewing of any one or any combination of the annotated recipe and the textual recipe while a user is cooking or performing other activities. In some examples, the first computing device 100A may superimpose any one or any combination of the annotated recipe and the textual recipe onto a field of view of the user through smart optics.

In some examples, any one or any combination of the annotated recipe and the textual recipe may be used by the user for future cooking.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising:
capturing, by an image sensor of a wearable device, one or more images of a physical environment around the wearable device;
identifying, based on at least one recognition engine of the wearable device, ingredients detected in the one or more images;
determining an amount of each of the ingredients detected in the one or more images;
identifying, based on the at least one recognition engine, utensils detected in the one or more images;
identifying, based on the at least one recognition engine, actions of a user based on the one or more images;
determining a time that each action of the actions is performed based on the one or more images;
building a recipe based on the ingredients, the amount of each of the ingredients, the utensils, the actions of the user, and the time that each action is performed as captured in the one or more images and processed by the at least one recognition engine;
determining a name for the recipe by the at least one recognition engine;
annotating the recipe with captions on at least a portion of the one or more images including the name of the recipe, the ingredients, the amount of each of the ingredients, the utensils, the actions of the user and the time that each action is performed; and
storing the recipe in a memory.

2. The method of claim 1, further comprising outputting the recipe on a display of the wearable device.

3. The method of claim 1, further comprising detecting a time spent on each action and a time between each action.

4. The method of claim 1, further comprising a smart phone in communication with the wearable device and the at least one recognition engine being disposed on the smart phone.

5. The method of claim 1, wherein the wearable device comprises smart glasses and identifying the actions comprises identifying the actions based on the one or more images and data output from one or more inertial sensors installed in another wearable device.

6. The method of claim 5, wherein the one or more inertial sensors comprises any one or any combination of an accelerometer, a gyroscope, and a magnetometer.

7. The method of claim 5, further comprising projecting, on a display of the smart glasses, the recipe onto a field of view of the user.

8. The method of claim 1, wherein the at least one recognition engine comprises a neural network trained to recognize any one or any combination of the ingredients, the utensils, and the actions of the user.

9. The method of claim 1, further comprising:
receiving sensor data; and
activating a recipe building mode of the wearable device, in response to the sensor data satisfying a commencement condition,
wherein the commencement condition comprises at least one of a location indicating the user is proximate to a kitchen or a location indicating the user is proximate to a place of creation of a previous recipe, and the at least one recognition engine identifying one or more objects associated with the kitchen.

10. The method of claim 9, wherein the commencement condition comprises data from a hunger sensor indicating the user being hungry.

11. The method of claim 9, wherein activating of the recipe building mode comprises activating the recipe building mode, in response to the at least one recognition engine recognizing an input from the user.

12. The method of claim 1, further comprising generating a textual recipe as an output based on the recipe with the captions.

13. A wearable device, comprising:
at least one processor; and
a memory storing instructions that, when executed by the at least one processor, configures the at least one processor to:
capture, by an image sensor of the wearable device, one or more images of a physical environment around the wearable device;
identify, based on at least one recognition engine of the wearable device, ingredients detected in the one or more images;
determine an amount of each of the ingredients detected in the one or more images;
identify, based on the at least one recognition engine, utensils detected in the one or more images;
identify, based on the at least one recognition engine, actions of a user based on the one or more images;
determine a time that each action of the actions is performed based on the one or more images;
build a recipe based on the ingredients, the amount of each of the ingredients, the utensils, the actions of the user, and the time that each action is performed as captured in the one or more images and processed by the at least one recognition engine;
determine a name for the recipe;
annotate the recipe with captions on at least a portion of the one or more images including the name of the recipe, the ingredients, the amount of each of the ingredients, the utensils, the actions of the user and the time that each action is performed; and
store the recipe in the memory.

14. The wearable device of claim 13, wherein the at least one processor is further configured to output the recipe on a display of the wearable device.

15. The wearable device of claim 13, further comprising a smart phone in communication with the wearable device and the at least one recognition engine being installed on the smart phone.

16. The wearable device of claim 13, wherein the at least one recognition engine comprises a neural network trained to recognize at least one of the ingredients, the utensils, or the actions of the user.

17. The wearable device of claim 13, wherein the at least one processor is further configured to:
receive sensor data; and
activate a recipe building mode of the wearable device, in response to the sensor data satisfying a commencement condition,
wherein the commencement condition comprises at least one of a location indicating the user is proximate to a kitchen or a location indicating the user is proximate to a place of creation of a previous recipe, and the at least one recognition engine identifying one or more objects associated with the kitchen.

18. The wearable device of claim 13, wherein the wearable device includes smart glasses.

19. A computer program product tangibly embodied on a non-transitory computer-readable medium and including executable code that, when executed, causes a wearable device to:
capture, by an image sensor of the wearable device, one or more images of a physical environment around the wearable device;
identify, based on at least one recognition engine of the wearable device, ingredients detected in the one or more images;
determine an amount of each of the ingredients detected in the one or more images;
identify, based on the at least one recognition engine, utensils detected in the one or more images;
identify, based on the at least one recognition engine, actions of a user based on the one or more images;
determine a time that each action of the actions is performed based on the one or more images;
build a recipe based on the ingredients, the amount of each of the ingredients, the utensils, the actions of the user, and the time that each action is performed as captured in the one or more images and processed by the at least one recognition engine;
determine a name for the recipe;
annotate the recipe with captions on at least a portion of the one or more images including the name of the recipe, the ingredients, the amount of each of the ingredients, the utensils, the actions of the user and the time that each action is performed; and
store the recipe in the memory.

20. The computer program product of claim 19, wherein the wearable device includes smart glasses.

* * * * *